United States Patent
Natori et al.

(10) Patent No.: US 8,537,408 B2
(45) Date of Patent: Sep. 17, 2013

(54) INFORMATION PROCESSING APPARATUS, INFORMATION PROCESSING METHOD, PROGRAM, AND STORAGE MEDIUM

(75) Inventors: Hideo Natori, Hino (JP); Kenichiro Uotani, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1480 days.

(21) Appl. No.: 11/953,747

(22) Filed: Dec. 10, 2007

(65) Prior Publication Data

US 2008/0151294 A1 Jun. 26, 2008

(30) Foreign Application Priority Data

Dec. 20, 2006 (JP) ................................. 2006-342823
Jan. 30, 2007 (JP) ................................. 2007-019469

(51) Int. Cl.
*G06K 15/00* (2006.01)

(52) U.S. Cl.
USPC ....... 358/1.18; 358/1.12; 358/1.13; 358/1.15; 358/1.16; 715/243; 715/244; 715/251; 715/701

(58) Field of Classification Search
USPC .................. 358/1.1, 1.6, 1.9, 1.13, 1.15, 1.16, 358/1.18, 1.12; 715/243, 244, 251, 701
See application file for complete search history.

(56) References Cited

U.S. PATENT DOCUMENTS

| | | | |
|---|---|---|---|
| 6,924,826 B1 * | 8/2005 | Nakagiri et al. | 715/700 |
| 7,301,656 B1 | 11/2007 | Nakagiri et al. | |
| 2003/0103221 A1 * | 6/2003 | Natori | 358/1.9 |
| 2003/0103227 A1 * | 6/2003 | Tomomatsu | 358/1.13 |
| 2004/0049741 A1 | 3/2004 | Natori | |
| 2004/0088654 A1 | 5/2004 | Uotani | |
| 2005/0286100 A1 | 12/2005 | Uotani et al. | |
| 2006/0023240 A1 * | 2/2006 | Natori | 358/1.13 |

FOREIGN PATENT DOCUMENTS

| | | |
|---|---|---|
| JP | 2001-130082 A | 5/2001 |
| JP | 2004-102618 A | 4/2004 |
| JP | 2004-110807 A | 4/2004 |
| JP | 2006-011847 A | 1/2006 |

* cited by examiner

*Primary Examiner* — Vu B Hang
(74) *Attorney, Agent, or Firm* — Carter, DeLuca, Farrell & Schmidt LLP

(57) ABSTRACT

An information processing apparatus performs layout processing on print data, performs a preview based on layout-processed print data, and stores the print data used in the preview into a print queue when actual print processing is performed, thus preventing the same print processing from being repeatedly performed.

16 Claims, 29 Drawing Sheets

FIG.6A

```
<?xml version="1.0" encoding="UTF-8"?>
<psf:PrintTicket
        xmlns:psf="http://schemas.microsoft.com/windows/2003/08/printing/printschemaframework"
        xmlns:psk="http://schemas.microsoft.com/windows/2003/08/printing/printschemakeywords"
        xmlns:xsi="http://www.w3.org/2001/XMLSchema-instance"
        xmlns:xsd="http://www.w3.org/2001/XMLSchema" version="1">
  <psf:Feature name="psk:JobNUpAllDocumentsContiguously">
    <psf:Option>
      <psf:ScoredProperty name="psk:PagesPerSheet">
        <psf:Value xsi:type="xsd:integer">2</psf:Value>
      </psf:ScoredProperty>
    </psf:Option>
  </psf:Feature>
  <psf:Feature name="psk:DocumentNUp">
    <psf:Option>
      <psf:ScoredProperty name="psk:PagesPerSheet">
        <psf:Value xsi:type="xsd:integer">2</psf:Value>
      </psf:ScoredProperty>
    </psf:Option>
  </psf:Feature>
</psf:PrintTicket>
```

FIG.6B

```
<?xml version="1.0" encoding="UTF-8"?>
<psf:PrintTicket
        xmlns:psf="http://schemas.microsoft.com/windows/2003/08/printing/printschemaframework"
        xmlns:psk="http://schemas.microsoft.com/windows/2003/08/printing/printschemakeywords"
        xmlns:xsi="http://www.w3.org/2001/XMLSchema-instance"
        xmlns:xsd="http://www.w3.org/2001/XMLSchema" version="1">
        xmlns:ns0000="http://www.cano-printer.com/ns/printschema/IJ-Private/v100">
  <psf:Feature name="psk:JobNUpAllDocumentsContiguously">
    <psf:Option>
      <psf:ScoredProperty name="psk:PagesPerSheet">
        <psf:Value xsi:type="xsd:integer">2</psf:Value>
      </psf:ScoredProperty>
    </psf:Option>
  </psf:Feature>
  <psf:Feature name="psk:DocumentNUp">
    <psf:Option>
      <psf:ScoredProperty name="psk:PagesPerSheet">
        <psf:Value xsi:type="xsd:integer">2</psf:Value>
      </psf:ScoredProperty>
    </psf:Option>
  </psf:Feature>
  <psf:Property name="ns0000:PreviewFilterProcess">
    <psf:Value xsi:type="xsd:string">Done</psf:Value>
  </psf:Property>
</psf:PrintTicket>
```

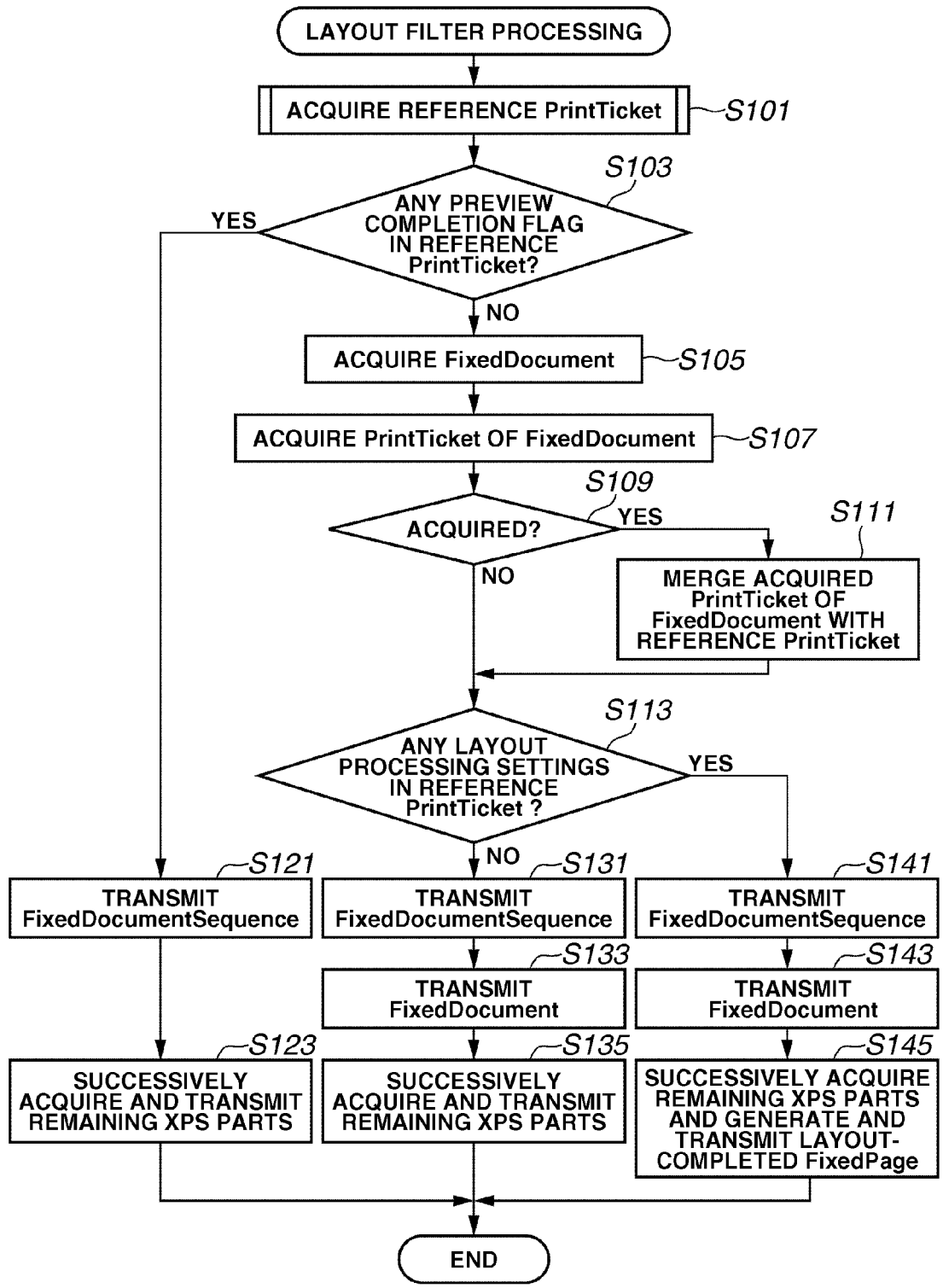

FIG.13A

```
<FixedPage
      xmlns="http://schemas.microsoft.com/xps/2005/06"
      xmlns:x="http://schemas.microsoft.com/xps/2005/06/resourcedictionary-key"
      xml:lang="en-us" Width="495" Height="916">
<FixedPage.Resources>
   <ResourceDictionary>
      <ImageBrush ......... ImugeSource="/Resources/Images/Image_1.png" />
   </ResourceDictionary>
</FixedPage.Resources>
<Path Fill="#FFFFEBCD" ......... />
<Path Fill="{StaticResource b 0}" ......... />
</FixedPage>
```

FIG.13B

```
<FixedPage
      xmlns="http://schemas.microsoft.com/xps/2005/06"
      xmlns:x="http://schemas.microsoft.com/xps/2005/06/resourcedictionary-key"
      xmlns:ns0000="http://www.cano-printer.com/ns/printschema/IJ-Private/v100"
      xml:lang="en-us" Width="495" Height="916">
<FixedPage.Resources>
   <ResourceDictionary>
      <ImageBrush ......... ImageSource="/Resources/Images/Image_1.png" />
   </ResourceDictionary>
</FixedPage.Resources>
<Path Fill="#FFFFEBCD" ......... />
<Path.Fill="{StaticResource b 0}" ......... />
<Path Data ......... ns0000:owner=Previewer>
   <ImageBrush ......... ImgeSource="/Resources/Image/Image_2.png" />
</Path.Fill>
</FixedPage>
```

FIG.14

```xml
<?xml Version="1.0" encoding="UTF-8"?>
<psf:PrintTicket
      xmlns=psf="http://schemas.microsoft.com/windows/2003/08/printing/printsehemaframework"
      xmlns=psk="http://schermas.microsoft.com/windows/2003/08/printing/printschemakeywords"
      xmlns=xsi="http://www.w3.org/2001/XMLSchema-instance"
      xmlns=xsd="http://www.w3.org/2001/XMLSchema" version="1"
      xmlns:ns0000="http://www.cano-printer.com/ns/printschema/IJ-Private/v100">
   <psf:Feature name="psk:PageMediaType">
     <psf:Option name="ns0000:Disc" />
  </psf:Feature>
   <psf:Feature name="psk:JobInputBin">
     <psf:Option name="ns0000:DiscTray" />
  </psf:Feature>
   <psf:Feature name="psk:PageMediaSize">
       <psf:Option name="ns0000:DiscTray" />
       <psf:ScoredProperty name="psk:MediaSizeWidth ">
         <psf:Value xsi:type="xsd:integer">131000</psf:Value>
       </psf:ScoredProperty>
       <psf:ScoredProperty name='psk:MediaSizeHeight ">
         <psf:Value xsi:type="xsd:integer">242550</psf:Value>
       </psf:ScoredProperty>
     </psf:Option>
   </psf:Feature>
</psf:PrintTicket>
```

FIG.21A

```
<?xml Version="1.0" encoding="UTF-8"?>
<psf:PrintTicket
    xmlns= psf="http://schemas.microsoft.com/windows/2003/08/printing/printschemafranlework'"
    xmlns=psk="http://schemas.microsoft.com/windows/2003/08/printing/printschemakeywords"
    xmlns:xsi="http://www.w3.org/2001/XMLSchema-instance"
    xmlns:xsd="http://www.w3.org/2001/XMLSchema "version="1"
    xmlns:ns0000="http://www.cano-printer.com/ns/printschema/IJ-Private/v100">
    <psf:Feature name="psk:JobNUpAllDocumentsContiguously ">
      <psf:Option>
        <psf:ScoredProperty name="psk:PagesPerSheet ">
          <psf:Value xsi:type="xsd:integer">1</psf:Value>
        </psf:ScoredProperty>
      </psf:Option>
    </psf:Feature>
    <psf:Feature name="psk:PageMediaType">
      <psf:Option name="psk:Plain" />
    </psf:Feature>
    <psf:Feature name="psk:JobInputBin">
      <psf:Option name="psk:Cassette" />
  </psf:Feature>
    <psf:Feature name="psk:PageMediaSize">
      <psf:Option name="psk:ISO A4">
        <psf:ScoredProperty name="psk:MediaSizeWidth ">
          <psf:Value xsi:type="xsd:integer">210000</psf:Value>
        </psf:ScoredProperty>
        <psf:ScoredProperty mame="psk:MediaSizeHeight ">
          <psf:Value xsi:type="xsd:integer">297000</psf:Value>
        </psf:ScoredProperty>
      </psf:Optiou>
    </psf:Feature>
</psf:PrintTicket>
```

FIG.21B

```
<?xml Version="1.0" encoding="'UTF-8"?>
<psf:PrintTicket
    xmlns=psi="http://schemas.microsoft.com/windows/2003/08/printing/printschemaframework"
    xmlns=psk="http://schemas.microsoft.com/windows/2003/08/printing/printschemakeywords"
    xmlns:xsi="http://www.w3.org/2001/XMLScherna-instance"
    xmlns:xsd="http://www.w3.org/2001/XMLSchema "version="1"
    xmlns:ns0000="http://www.cano-printer.com/ns/printschema/IJ-Private/v100">
    <psf:Feature name="psk:JobNUpAllDocumentsContiguously "ns0000:layoutfilterprocess=done" >
      <psf:Option>
        <psf:ScoredProperty name="psk:PagesPerSheet">
          <psf:Value xsi:type="xsd:integer">2</psf:Value>
        </psf:ScoredProperty>
      </psf:Option>
    </psf:Feature>
    <psf:Feature name="psk:PageMediaType">
      <psf:Option name="psk:Plain" />
    </psf:Feature>
    <psf:Feature name="psk:JobInputBin">
      <psf:Option name="psk:Cassette" />
  </psf:Feature>
    <psf:Feature name="psk:PageMediaSize" ns0000:layoutfilterprocess=done" >
      <psf:Option name="psk:ISO A4">
        <psf:ScoredProperty name="psk:MediaSizeWidth ">
          <psf:Value xsi:type="xsd:integer">210000</psf:Value>
        </psf:ScoredProperty>
        <psf:ScoredProperty name="psk:MediaSizeHeight ">
          <psf:Value xsi:type="xsd:integer">297000</psf:Value>
        </psf:ScoredProperty>
      </psf:Option>
    </psf:Feature>
</psf:PrintTicket>
```

FIG.22

```xml
<?xml Version="1.0" encoding="UTF-8"?>
<psf:PrintCapabilities
    xmlns=psi="http://schemas.microsoft.com/windows/2003/08/printing/printschemaframework"
    xmlns=psk="http://schemas.microsoft.com/windows/2003/08/printing/printschemakeywords"
    xmlns=xsi="http://www.w3.org/2001/XMLSchema-instance"
    xmlns=xsd="http://www.w3.org/2001/XMLSchema "version="1"
    xmlns:ns0000="http://www.cano-printer.com/ns/printschema/IJ-Private/v100">
  <psf:Feature name="psk:PageMediaSize">
    <psf:Property name="psf:SelectionType ">
      <psf:Value xsi:type="xsd:QName">psk:PickOne</psf:Value>
    </psf:Property>
    <psf:Property name="psk:DiplayName">
      <psf:Value xsi:type="xsd:string">OUTPUT SHEET</psf:Value>
    </psf:Property>
    <psf:Option name="psk:ISO A5" constrained="psk:None">
      <psf:Property name="psk:DiplayName">
        <psf:Value xsi:type="xsd:string">A5</psf:Value>
      </psf:Property>
    </psf:Option>
    <psf:Option name="psk:ISO A4" constrained="psk:None">
      <psf:Property name="psk:DiplayName">
        <psf:Value xsi:type="xsd:string">A4</psf:Value>
      </psf:Property>
    </psf:Option>
    <psf:Option name="psk:JISB5" constrained="psk:None">
      <psf:Property name="psk:DiplayName">
        <psf:Value xsi:type="xsd:string">B5</psf:Value>
      </psf:Property>
    </psf:Option>
    <psf:Option name="psk:JapanLPhoto" constrained="psk:None">
      <psf:Property name="psk:DiplayName">
        <psf:Value xsi:type="xsd:string">L SIZE</psf:Value>
      </psf:Property>
    </psf:Option >
    <psf:Option name="Japan2LPhoto" constrained="psk:None">
      <psf:Property name="psk:DiplayName">
        <psf:Value xsi:type="xsd:string">2L SIZE</psf:Value>
      </psf:Property>
    </psf:Option>
  </psf:Feature>
</psf:PrintCapabilities>
```

FIG.29

FD/CD-ROM OR COMPARABLE STORAGE MEDIUM

| DIRECTORY INFORMATION |
|---|
| PROGRAM CODE CORRESPONDING TO PROCESSING STEPS IN FIG. 8 |
| PROGRAM CODE CORRESPONDING TO PROCESSING STEPS IN FIG. 9 |
| PROGRAM CODE CORRESPONDING TO PROCESSING STEPS IN FIG. 10 |
| PROGRAM CODE CORRESPONDING TO PROCESSING STEPS IN FIG. 11 |
| PROGRAM CODE CORRESPONDING TO PROCESSING STEPS IN FIG. 15 |
| PROGRAM CODE CORRESPONDING TO PROCESSING STEPS IN FIG. 16 |
| PROGRAM CODE CORRESPONDING TO PROCESSING STEPS IN FIG. 17 |
| PROGRAM CODE CORRESPONDING TO PROCESSING STEPS IN FIG. 18 |
| PROGRAM CODE CORRESPONDING TO PROCESSING STEPS IN FIG. 19 |
| PROGRAM CODE CORRESPONDING TO PROCESSING STEPS IN FIG. 20 |
| PROGRAM CODE CORRESPONDING TO PROCESSING STEPS IN FIG. 25 |
| PROGRAM CODE CORRESPONDING TO PROCESSING STEPS IN FIG. 26 |
| PROGRAM CODE CORRESPONDING TO PROCESSING STEPS IN FIG. 27 |
| PROGRAM CODE CORRESPONDING TO PROCESSING STEPS IN FIG. 28 |
| × |

INFORMATION PROCESSING APPARATUS, INFORMATION PROCESSING METHOD, PROGRAM, AND STORAGE MEDIUM

BACKGROUND OF THE INVENTION

1. Field of the Invention

The present invention relates to an information processing apparatus having a preview function for presenting (displaying) a visually recognizable print image to a user, for example, before performing print processing, and relates to an information processing method, a program, and a storage medium.

2. Description of the Related Art

A conventional image processing system acquires a print image to be printed and displays the image on a screen beforehand.

According to a conventionally known technique, a computer (data processing apparatus) is associated with a printer to analyze a print command that is interpretable by the printer. The computer creates print commands for each of CMYK planes and generates a print image. Furthermore, after a computer transmits a print command to a printer, the computer receives print image data generated by the printer and displays a print image based on the received data.

A representative operating system (OS) for a computer incorporated in a printing system is, for example, Windows® provided by Microsoft Corporation. An application program installed on a computer can generate print data. The generated print data is stored in a spool file according to a standard data format of the OS. The OS invokes a printer driver to print the print data. The printer driver reads print data from the spool file. An image generation processing unit generates print image, and converts the generated print image into a print command that is interpretable by a printer. The print command is transmitted to the printer. The printer interprets the print command and executes print processing for forming a print image on a recording medium.

A printer driver of a conventional printing system can activate a previewer capable of providing a preview function for displaying an image to be printed before starting print processing. An image generation unit generates a print image to be previewed. The previewer displays the generated preview print image. Namely, the preview function of the printer driver can be realized by the image generation unit that generates a print image and the previewer that displays the print image, as discussed in Japanese Patent Application Laid-Open No. 2004-102618 corresponding to U.S. Patent Application Publication No. 2004-0049741.

A conventional printing system can combine print jobs and perform a preview considering the layout of each print job. More specifically, the printing system generates an integrated job composed of a plurality of print jobs each including print data converted into the intermediate code format while storing layout information of each print job involved in this integrated job. In displaying a preview of combined jobs, the printing system reproduces the layout of respective print jobs involved in the integrated job by referring to the layout information of a page to be previewed. During a preview operation, the printing system can change layout information of respective print jobs in the integrated job without having any adverse effects on other print jobs because the printing system stores the layout information in addition to the intermediate data, as discussed in Japanese Patent Application Laid-Open No. 2001-130082 corresponding to U.S. patent application Ser. No. 09/698,052 filed on Oct. 30, 2000.

In addition, the previewer may process (modify) a preview print image generated by the image generation unit before performing a preview display, so that an image can be accurately printed on a disk-shaped recording medium (e.g., CD-R) or on a complicated rectangular medium. In this case, a conventional method (a CD-R area display function) enables a user to confirm image areas positioned inside and outside a medium area through the preview display of print contents beforehand, as discussed in Japanese Patent Application Laid-Open No. 2004-110807 corresponding to U.S. Patent Application Publication No. 2004-0088654.

Furthermore, a conventional printing system allows a user to confirm print setting contents in addition to preview contents. A conventional printing system enables a user to change print settings during a preview display operation and continue actual print processing if any erroneous print setting is found during the preview display (referred to as "print setting change function"), as discussed in Japanese Patent Application Laid-Open No. 2006-011847 corresponding to U.S. Patent Application Publication No. 2005-0286100.

The above-described conventional technique includes the following problems to be solved. One of the above-described conventional printing systems can execute a preview while the printer driver is invoked by the OS. The print processing object of the printer driver invoked by the OS is the front print job in a print queue. In general, the print processing object is only one print job for each print queue. Accordingly, other print jobs in the print queue are not a print object for the printing system that is currently executing a preview function.

Therefore, if the print queue includes any print job being currently processed, the conventional printing system cannot execute a preview function for other print jobs. Furthermore, the printing system cannot start printing other jobs remaining in the same print queue before the printing system completes the preview of a presently processed job. Furthermore, when a plurality of users of the same OS simultaneously issue print jobs, the users cannot simultaneously use the preview function.

A printing system performs layout processing to generate a preview print image. At this moment, the above-described print job is intermediate data. Therefore, the printing system further performs bitmap processing for a display of a preview screen. However, the preview bitmap data subjected to the bitmap processing for a screen display may not be suitable for a printer that actually executes print processing and cannot be used for other purposes. More specifically, to generate a print image for an actual print operation, the printing system is required to perform the layout processing again. Namely, the printing system repeatedly performs the same layout processing every time a print image is generated.

When two or more print jobs are combined, another conventional printing system separately stores layout information of the integrated print jobs. Thus, the printing system is required to perform layout processing for displaying a print image using the preview function. Furthermore, a conventional printing system can change layout information during a preview operation. In this case, the printing system necessarily performs the layout processing for actual print processing performed by a printer. Namely, if the layout information is not changed during a preview operation, the printing system repeatedly performs the same layout processing for the preview operation and actual print processing.

SUMMARY OF THE INVENTION

Exemplary embodiments of the present invention are directed to an information processing apparatus having a preview function that prevents the same layout processing from being repeatedly performed and enables a user to effectively perform print processing. Furthermore, exemplary embodiments of the present invention are directed to an information processing apparatus that does not print preview-oriented information added for a preview operation.

According to an aspect of the present invention, an information processing apparatus includes a layout processing unit configured to receive document data from a spool file, a preview document generation unit configured to receive document data from the layout processing unit, a print command generation processing unit configured to receive document data from the preview document generation unit, and a preview control unit configured to control a preview based on preview document data. If a preview flag is set, the layout processing unit is configured to output the document data received from the spool file to the preview document generation unit without performing layout processing based on print setting information. If the preview flag is not set, the layout processing unit is configured to perform layout processing on the document data received from the spool file based on the print setting information and to output layout-processed document data to the preview document generation unit. If the preview is completed or the preview is not set, the preview document generation unit is configured to output the layout-processed document data to the print command generation processing unit. If the preview is set while the preview is not completed, the preview document generation unit is configured to set a preview flag and to generate preview document data based on the layout-processed document data. The preview control unit is configured to output, to the spool file, document data to which a preview flag is set based on a print instruction. The print command generation processing unit is configured to convert the layout-processed document data into a print command that is interpretable by a printer.

According to another aspect of the present invention, a method includes, if a preview flag is set, outputting document data received from a spool file without performing layout processing based on print setting information; if the preview flag is not set, performing layout processing on the document data received from the spool file based on the print setting information and outputting layout-processed document data; if a preview is completed or the preview is not set, outputting the layout-processed document data; if the preview is set while the preview is not completed, setting a preview flag and generating preview document data based on the layout-processed document data; outputting, to the spool file, document data to which a preview flag is set based on a print instruction; and converting the layout-processed document data into a print command that is interpretable by a printer.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain at least some of the principles of the invention.

FIGS. 6A and 6B illustrate storage of a preview completion flag according to an exemplary embodiment of the present invention.

FIG. 8 is a flowchart illustrating an example of layout filter processing according to an exemplary embodiment of the present invention.

FIGS. 13A and 13B illustrate examples of FixedPage for performing a CD-R area display according to the second exemplary embodiment of the present invention.

FIG. 14 illustrates an example of PrintTicket including CD-R print settings according to the second exemplary embodiment of the present invention.

FIGS. 21A and 21B illustrate examples of PrintTicket subjected to processing-completion flag storage processing according to a fourth exemplary embodiment of the present invention.

FIG. 22 illustrates an example of PrintCapabilities according to the fourth exemplary embodiment of the present invention.

FIG. 29 illustrates a memory map of a storage medium that stores various data processing programs readable by an information processing apparatus according to the present invention.

DETAILED DESCRIPTION OF THE EMBODIMENTS

Figure 1:
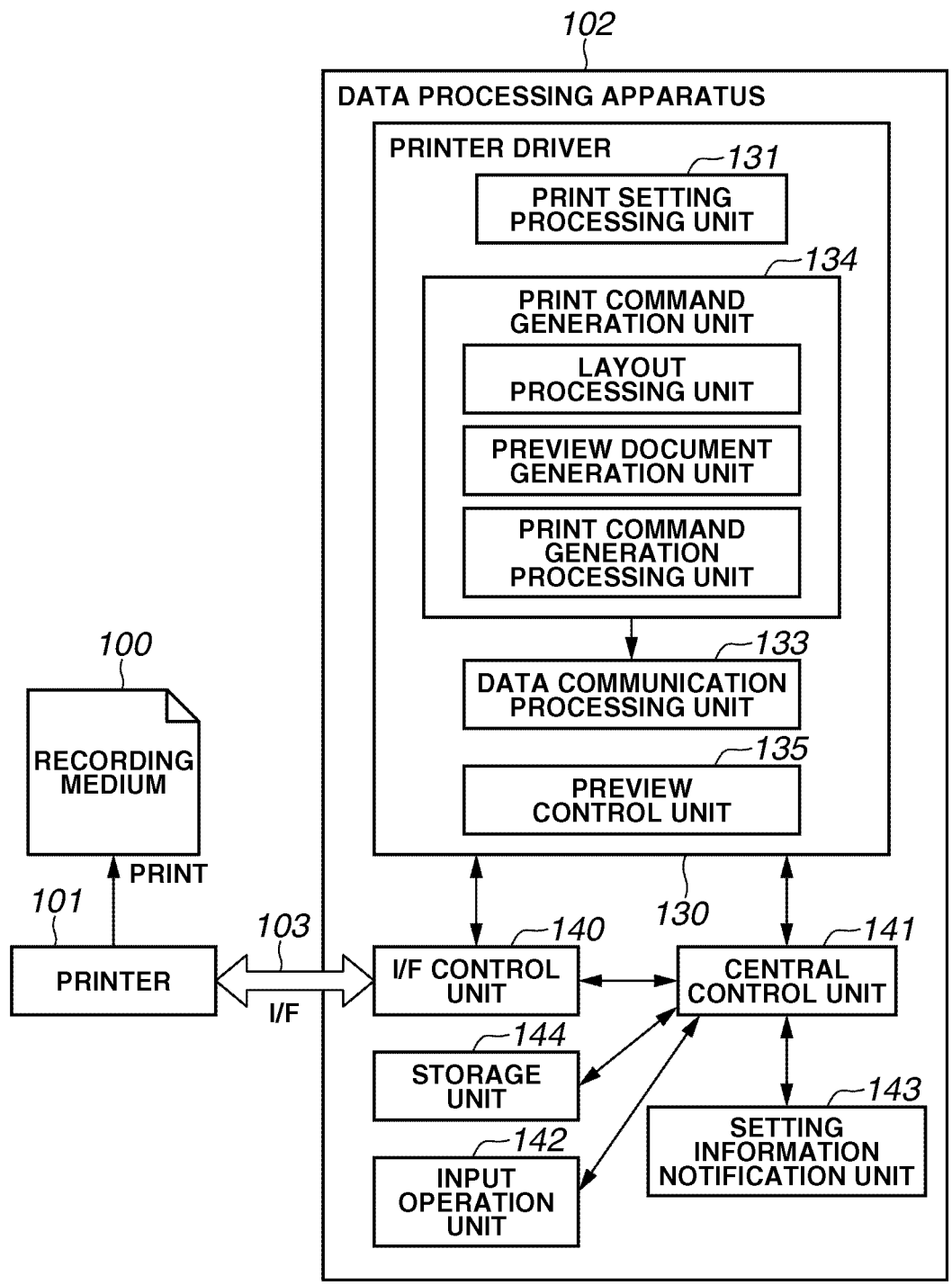
FIG. 1 is a block diagram illustrating a printing system according to an exemplary embodiment of the present invention.

The following description of exemplary embodiments is illustrative in nature and is in no way intended to limit the invention, its application, or uses. It is noted that throughout the specification, similar reference numerals and letters refer to similar items in the following figures, and thus once an item is described in one figure, it may not be discussed for following figures. Exemplary embodiments of the present invention are described in detail with reference to attached drawings.

In the following description, XPS represents XML Paper Specification developed by Microsoft Corporation as one of open-standard electronic document formats.

In general, an XPS document has a tree structure composed of at least one FixedDocumentSequence (hereinafter, referred to as FDS) as a root element. The FDS includes a plurality of FixedDocuments (hereinafter, referred to as FD) Each FD includes a plurality of FixedPages (hereinafter, referred to as FP). Each of FDS, FD, and FP may be referred to as XPS part.

The FP includes contents of a document page (including actually displayed or printed contents) described according to an XML format. The resources, such as fonts and images, used for page contents of each FP can be commonly used among a plurality of FPs. Print settings of FDS, FD, and FP can be described in a PrintTicket (hereinafter, referred to as PT). The PT includes print settings (i.e., settings for printing an XPS document) described according to the XML format. The PT describing print settings for printing each FP is a combined PT merging a PT of the FDS, a PT of a parent FD of a print object FP, and a PT of the print object FP.

Figure 5:
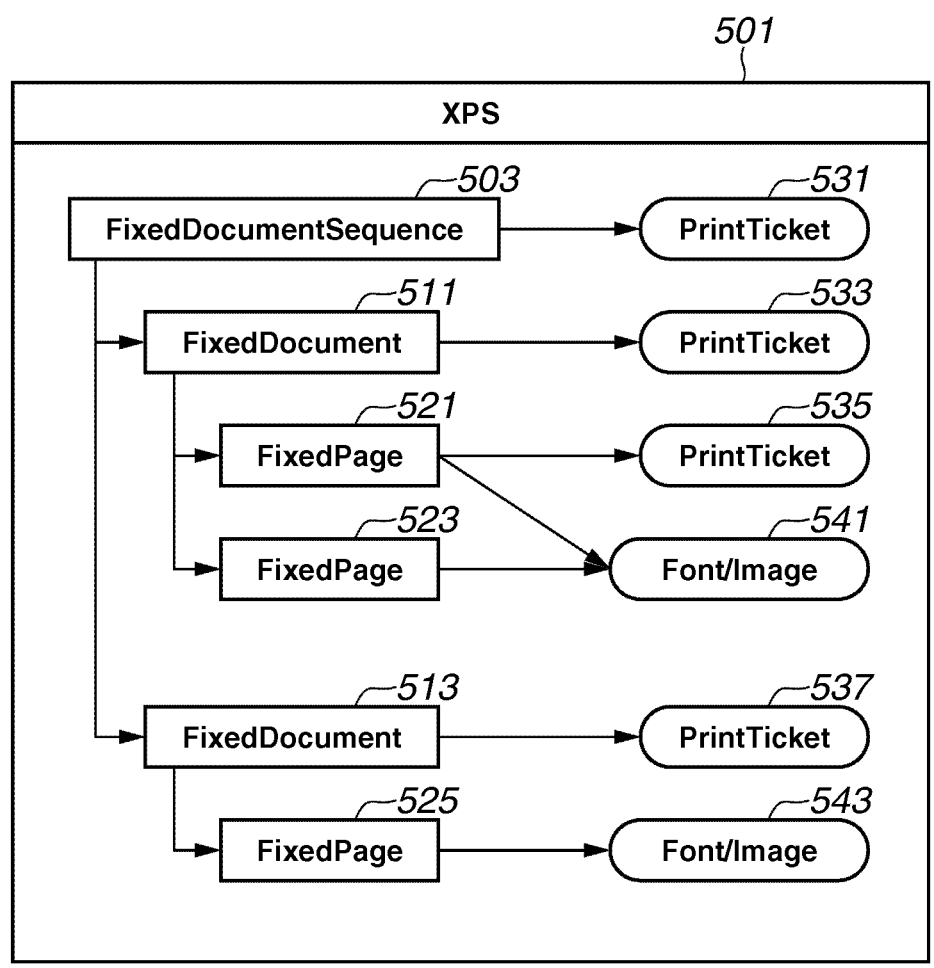
FIG. 5 illustrates a logical structure of Extensible Markup Language (XML) Paper Specification (XPS).

FIG. 5 is a block diagram illustrating a logical structure of an XML document 501 which has a tree structure including FDS 503 as a root element. The FDS 503 includes FD 511 and FD 513 (children). The FD 511 includes FP 521 and FP 523 (children). The FD 513 includes FP 525 (child). Regarding the PT describing print settings, the FDS 503 stores PT 531. The FD 511 stores PT 533. The FP 521 stores PT 535. The FD 513 stores PT 537. The FP 523 and the FP 525 do not store any PT. The FP 521 and the FP 523 commonly use font/image resource 541. The FP 525 uses font/image resource 543. For example, a PT used for printing the FP 521 is a combined PT merging the PT 531, the PT 533, and the PT 535.

As described above, the XPS document can be easily understood by introducing the concept of logical XPS parts. As the XPS document itself can be regarded as a byte stream, internal data of the XPS document may be referred to as XPS data. Accordingly, exemplary embodiments of the present invention are described using XPS parts and XPS data.

First Exemplary Embodiment

FIG. 1 is a block diagram illustrating a printing system according to an exemplary embodiment of the present invention. A printer 101 is an inkjet printer capable of performing image forming processing. Namely, the printer 101 can form an image on a recording medium 100 based on a print command generated by a data processing apparatus 102. Although the type of the printer 101 is not limited, an exemplary embodiment uses an inkjet color printer.

In the data processing apparatus 102, an application generates a print job and a printer driver generates a print command based on spool data of the generated print job so that the associated printer 101 can control a print operation. The data processing apparatus 102 according to an exemplary embodiment is a personal computer that can accept print settings instructed or input by a user. The data processing apparatus 102 includes printer driver 130 which includes various functional blocks including a print setting processing unit 131, print command generation unit 134, data communication processing unit 133, and preview control unit 135. The data processing apparatus 102 also includes an I/F control unit 140, central control unit 141, input operation unit 142, setting information notification unit 143, and storage unit 144. An operating system (OS) installed on the data processing apparatus 102 controls various functional blocks of the data processing apparatus 102.

A communication interface 103 is provided for communication between the data processing apparatus 102 and the printer 101. An example of the communication interface 103 is a serial interface (e.g., USB, IEEE1394, Ethernet®, IrDA, IEEE802.11, or power line), a parallel interface (e.g., Centronics or SCSI), or any other wired/wireless interface capable of realizing communications. The printing system according to an exemplary embodiment is not a single apparatus.

The data processing apparatus 102 and the printer 101 (i.e., an apparatus performing image forming processing) are mutually connected via a specific bi-directional interface. However, the present invention is not limited to the disclosed example and, therefore, can be an integrated printing system having functions comparable to a combination of a data processing apparatus and a printer.

The central control unit 141 controls various functions of the data processing apparatus 102. The processing performed by the central control unit 141 corresponds to a function of a central processing unit (CPU). The input operation unit 142 includes various input devices that allow a user to instruct print settings. The setting information notification unit 143 notifies a user of print settings. An exemplary notification device is, for example, a monitor or any other display device or a sound generating device.

The interface (I/F) control unit 140 controls an interface function of the data processing apparatus 102. A universal serial bus (USB) host controller can realize the function of the I/F control unit 140. In this respect, the I/F control unit 140 includes a function of the USB host. The software (e.g., the OS or a driver) can constitute part of the function of the USB host. A storage unit 144 stores the OS and application programs as well as command code of the printer driver. The software can use the storage unit 144 to temporarily store data and read the stored data for operation. The storage unit 144 is, for example, a hard disk drive or a semiconductor memory.

A printer driver 130 is the software enabling a user of the data processing apparatus 102 to instruct various print settings, generate print data, and control the printer 101. The central control unit 141 executes a program of the printer driver to realize a print setting processing unit 131, a print command generation unit 134 including a layout processing unit, a preview document generation unit, and a print command generation processing unit, and a data communication processing unit 133.

The print setting processing unit 131 performs various print settings including sheet settings and print quality settings. The print setting processing unit 131 receives an instruction or an input from a user, and displays or notifies setting contents.

In the print command generation unit 134, the layout processing unit performs page layout processing for a print job generated by an application. The preview document generation unit generates a preview document according to print settings. The print command generation processing unit converts print data having been subjected to the layout processing into a print command. The print command generation unit 134 transmits the generated print command to the I/F control unit 140 via the data communication processing unit 133.

The I/F control unit 140 transmits the print command to the printer 101. A preview control unit 135 provides a preview function to a user. The preview function of the preview control unit 135 includes displaying a print image of the preview document via the setting information notification unit 143, acquiring user's instructions via the input operation unit 142, switching a print image to be displayed, continuing a print operation, and canceling the print operation.

Figure 2:
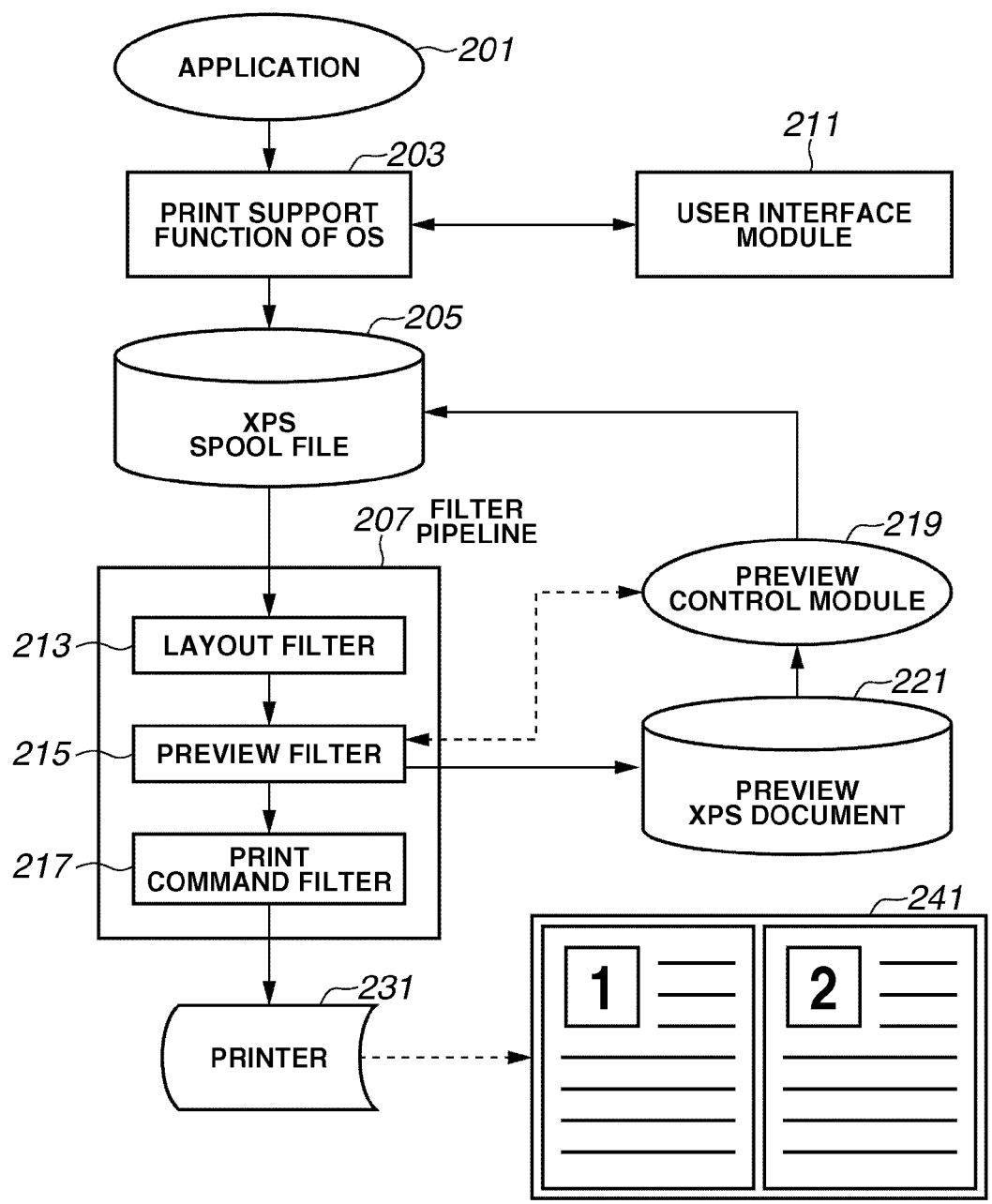
FIG. 2 is a block diagram illustrating a printer driver according to an exemplary embodiment of the present invention.

FIG. 2 is a block diagram illustrating a conceptual configuration of the printing system illustrated in FIG. 1, which includes a print support function of the OS and a printer driver according to an exemplary embodiment of the present invention. In FIG. 2, modules relating to the present embodiment are a user interface module 211 capable of functioning as the print setting processing unit 131 and a filter pipeline 207 capable of functioning as the print command generation unit 134.

The filter pipeline 207 includes a layout filter 213, a preview filter 215, and a print command filter 217. The layout filter 213 performs processing for determining a page layout of XPS data. The preview filter 215 provides a preview function. The print command filter 217 converts the XPS data into a print command that is interpretable by a printer.

In the present embodiment, the filter is a program capable of generating any output data based on input data through various (e.g., processing, conversion, non-conversion, and generation) processes.

According to the printing system in FIG. 2, print data of each page of a document generated by the application 201 is temporarily stored in an XPS spool file 205 via a print support function 203 of the OS. The filter pipeline 207 of the printer driver converts the print data into a print command that is interpretable by the printer 231 and supplies the print command to the printer 231.

The user interface module 211 enables a user to set various print attributes including a sheet size and a print direction. The user interface module 211 further allows a user to set a preview for displaying a print image before the printer starts a print operation. The user interface module 211 returns print setting information (setting values of a plurality of print setting items) to the application 201. An exemplary print setting dialog provided by the user interface module 211 is described below with reference to FIG. 3.

In printing a generated document, the application 201 notifies the print support function 203 of starting/terminating a print operation, print setting information returned from the user interface module 211, or starting/terminating a drawing operation of each document page. The print support function 203 of the OS stores the drawing contents of the application 201 and print setting information into the XPS spool file 205.

The filter pipeline 207, including one or more filters, reads print setting information and XPS parts from the XPS spool file 205, converts the read information into a print command that is interpretable by the printer 231, and supplies the print command to the printer 231, which performs print processing.

The print support function 203 of the OS invokes each filter when a spooled print job is de-spooled. The spooled XPS data can be edited while maintaining the contents of XPS data passing through each filter of the filter pipeline 207, or converted into a data format unique to the driver, and finally converted into a print command that is interpretable by the printer 231.

When the processing for XPS data of a print job is entirely completed, or when the print job is cancelled, each filter of the filter pipeline 207 terminates the operation. The filter pipeline 207 according to an exemplary embodiment includes the layout filter 213 (i.e., the layout processing unit), the preview filter 215 (i.e., preview document generation unit), and the print command filter 217 (i.e., print command generation processing unit).

The layout filter 213 performs page layout processing on XPS data received from the XPS spool file 205 according to print setting information. The layout filter 213 generates layout-completed XPS data. If the print setting information does not include any layout settings, or if a preview completion flag is stored, the layout filter 213 directly outputs the received XPS data. The layout processing according to an exemplary embodiment includes an N-up print for printing a plurality of pages on a single sheet surface or a poster print for printing a single page on a plurality of sheet surfaces.

The preview filter 215 receives an output of the layout filter 213 and provides a preview function for enabling a user to check (confirm) a preview image based on the print setting information. If the print setting information indicates that a preview setting is OFF, or if the print setting information includes a preview completion flag, the preview filter 215 directly outputs the received XPS data.

If the print setting information does not include a preview completion flag and the preview setting is ON, the preview filter 215 stores a preview completion flag into a PT (i.e., print setting information of FDS).

Next, the preview filter 215 activates a preview control module 219 and prepares a preview XPS document 221. The preview filter 215 stores the FDS in the preview XPS document 221. Then, the preview filter 215 caches each input XPS part and stores the cached XPS part into the preview XPS document 221.

If the preview filter 215 receives a print continuation notification from the preview control module 219 before processing a finally input XPS part, the preview filter 215 outputs the FDS and cached XPS parts and acquires the remaining XPS parts from the input. Further, the preview filter 215 directly outputs the acquired XPS parts. Furthermore, the preview filter 215 completes the preview XPS document 221 and terminates the processing of each filter.

The print command filter 217 receives an output of the preview filter 215 and converts the XPS data into a print command that is interpretable by the printer 231 according to print setting information. The print command filter 217 outputs the print command to the printer 231. The print command filter 217 may be referred to as a render filter if the print command filter 217 once converts the input XPS data into image data. The render filter is generally used for a printer driver of an inkjet printer or other low-price raster printer.

The print command filter 217, if it operates as a render filter, converts the input XPS data into image data, applies image processing (e.g., color space conversion, binarization, etc.) to the image data, and generates a print command that is interpretable by a raster printer. If a high-function printer (e.g., a page printer) can interpret an XPS print command, the print command filter 217 edits the input XPS data and outputs XPS data. The print command filter 217 directly outputs the input XPS data if the print command filter 217 is not required to process the data. In this case, the print command filter 217 is not required for the printer driver.

The printer 231 (i.e., an output device) interprets a print command received from the filter pipeline 207, and forms a visible image on a print sheet 241. An exemplary print result on the print sheet 241 is 2-up print processing performed by the layout filter 213.

The 2-up print processing includes reducing the size of two pages of the XPS spool file 205 and printing an image of reduced pages on a single sheet surface. In general, the N-up print processing includes reducing the size of N pages so that the reduced pages can be disposed on the same sheet surface. Accordingly, a layout-completed page generated by the N-up layout processing includes an XML description relating to the contents of a plurality of pages stored in the XPS spool file 205.

For example, the size of an XML description relating to the page contents subjected to the 2-up layout processing is approximately the double size of an XML description relating to page contents stored in the XPS spool file 205. Similarly, the size of an XML description relating to the page contents subjected to the N-up layout processing is appropriately N times of the size of an XML description relating to page contents stored in the XPS spool file 205.

Therefore, if the page contents stored in the XPS spool file 205 is complicated, the size of an XML description relating to the page contents becomes larger. The cost required for the layout processing increases. If a large number of pages (N) are involved in the N-up print processing, the cost required for the layout processing increases.

The preview control module 219 reads the preview XPS document 221 and provides a preview function for a user. The preview control module 219 provides a preview user interface, displays a print image, switches a print image of a page to be displayed according to a user's instruction, continues print processing, and interrupts print processing.

If a user instructs print start when the preview filter 215 is writing XPS data into the preview XPS document 221, the preview control module 219 notifies the preview filter 215 of continuing the print processing and terminates the processing. If a user instructs print cancellation when the preview filter 215 is writing XPS data into the preview XPS document 221, the preview control module 219 cancels a print job and terminates the processing.

If a user instructs print start after the preview XPS document 221 is completed, the preview control module 219 generates a new print job based on the data of the preview XPS document 221 and terminates the processing. If a user instructs print cancellation after the preview XPS document 221 is completed, the preview control module 219 terminates the processing. The preview control module 219 deletes the preview XPS document 221 before terminating the processing. The preview control module 219 provides a preview window illustrated in FIG. 4.

An exemplary 2-up print operation is performed when the preview setting is ON as described below with reference to FIG. 2. The application 201 can use a print setting function of the user interface module 211 via the print support function 203 of the OS. The print setting information includes a preview setting being set to ON and a layout setting being set to 2-up.

The application 201 starts printing a document composed of a plurality of pages according to the acquired print setting information. The document print data of the application 201 and the print setting information are stored into the XPS spool file 205 via the print support function of the OS. The print support function of the OS activates the filter pipeline 207 upon starting spooling document pages into the XPS spool file 205.

The layout filter 213 performs page layout processing referring to the print setting information indicating that the layout print setting is 2-up, and outputs a layout-processed page. The preview filter 215 adds a preview completion flag to the print setting information, and stores print settings and XPS data into the preview XPS document 221. Then, the preview filter 215 activates the preview control module 219. The preview control module 219 displays a print image based on the preview XPS document 221 and provides a print function to a user.

If the designated layout setting is 2-up, a document of the application 201 is composed of two pages. The number of pages stored in the preview XPS document 221 is one page. Accordingly, generation of the preview XPS document 221 is completed. If a user instructs print start to the preview control module 219, a new print job is generated and the contents of the preview XPS document 221 are directly stored.

When a new print job is printed again, the print setting information includes a preview completion flag. Therefore, the layout filter 213 and the preview filter 215 directly output the input data. The print command filter 217 converts the input XPS data into a print command that is interpretable by the printer 231. The printer 231 interprets the supplied print command and forms an image on a print sheet (i.e., output result 241).

If a document of the application 201 includes a large number of pages, the printing system may be unable to completely generate the preview XPS document 221 when a user instructs print start to the preview control module 219. In this case, the preview control module 219 notifies the preview filter 215 of continuing the print processing. The preview filter 215 stops generating the preview XPS document 221 and outputs all of the stored XPS parts, acquires remaining XPS parts from the input and outputs the acquired XPS parts. Next, the print command filter 217 converts the input into a print command. The printer 231 interprets the print command and generates the print result 241.

As described above, an exemplary embodiment does not perform layout processing if the print operation is continued. Therefore, the exemplary embodiment can prevent the same processing from being repeatedly executed and can realize effective print processing.

Furthermore, if the preview XPS document 221 is completed during a preview of a print job, the printing system can once stop the print processing of this print job. Therefore, the printing system can start print processing of a succeeding print job remaining in a print queue. Accordingly, when a preview of a print job is performed, the printing system can perform a preview of another print job and generate a print command of another print job, and can activate the printer.

According to an exemplary embodiment, the filter pipeline 207 includes three filters. However, the filter pipeline 207 can include a single filter functionally equivalent to the above-described plurality of filters.

For the purpose of simplifying the description of an exemplary embodiment, the input/output (except for a print command) of each filter is the XPS part. However, the input/output of each filter can be a stream of XPS data.

Figure 3:
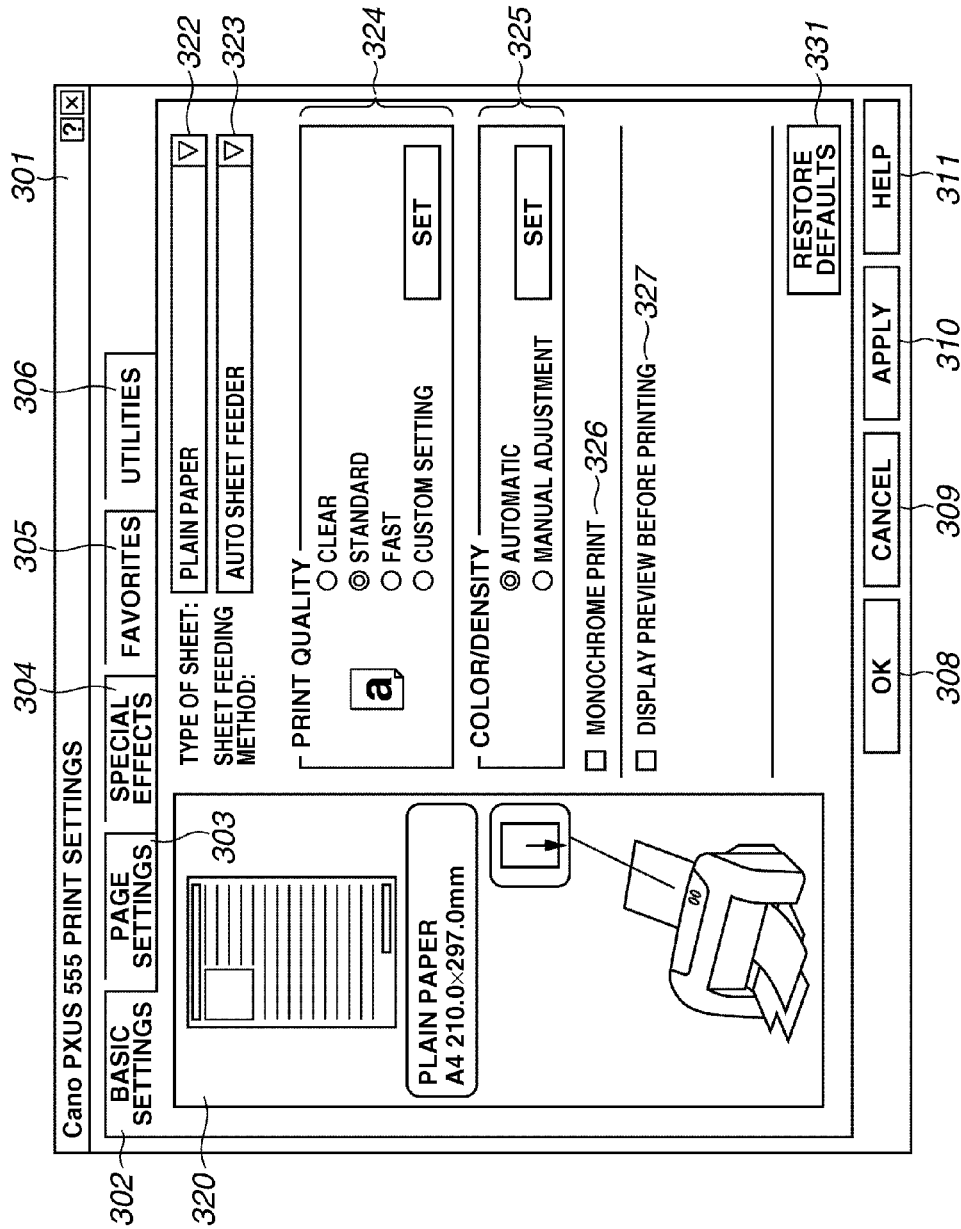
FIG. 3 illustrates a print setting dialog according to an exemplary embodiment of the present invention.

FIG. 3 illustrates an exemplary print setting dialog 301, which can be displayed when a user performs various sheet settings (including a print mode setting). The print setting dialog 301 includes a plurality of display areas (tab sheets) 302 to 311 and 320 to 331. As the print settings include numerous items to be displayed, the print setting dialog 301 includes a plurality of tab sheets that can classify the setting items according to the category of each item.

The display example illustrated in FIG. 3 is a basic setting tab 302 that includes a simple display area 320 of basic settings (composed of character information and image information). There is also provided a page settings tab 303, special effects tab 304, favorites tab 305, and utilities tab 306. A sheet type selection field 322 displays a type of sheet that is selected by a user. The sheet type selection field 322 is a drop-down menu that, if clicked by a user, can display a list of selectable sheet types together with the selected sheet type. The selectable sheet types include plain paper, glossy paper, coated paper, photo paper, postcard, New Year's card, which the printer can use as print sheets.

A sheet feeding method selection field 323 displays a sheet feeding method of the printer, which can be selected by a user. More specifically, the sheet feeding method selection field 323 enables a user to select "automatic paper feeding" (e.g., a paper feeding tray or a paper feeding cassette) or "manual paper feeding" (e.g., a paper feeding port through which a user can manually feed one or more print sheets).

A print quality selection field 324 enables a user to select an appropriate print quality level. A color adjustment field 325 enables a user to adjust print colors. A monochrome print setting field 326 includes a check box that, if checked by a user, sets a gray-scale print even if an original document is a color document.

A preview print setting field 327 includes a check box that allows a user to confirm how the print settings have effects on an actual print document before the printer starts a print operation. A user can press a RESTORE DEFAULTS button 331 to change setting values of the basic setting tab 302 to standard (default setting) values.

After completing selection of the setting items, a user can press an OK button 308 to fix the selected print settings for a print operation and close the print setting dialog 301. A user can press a CANCEL button 309 to discard all contents of selected setting items and close the print setting dialog 301. A user can press an APPLY button 310 to fix the selected print settings while maintaining the print setting dialog 301 in an opened state. A user can press a HELP button 311 to open another window that displays a text describing details of each setting item of the basic setting tab 302.

Figure 4:
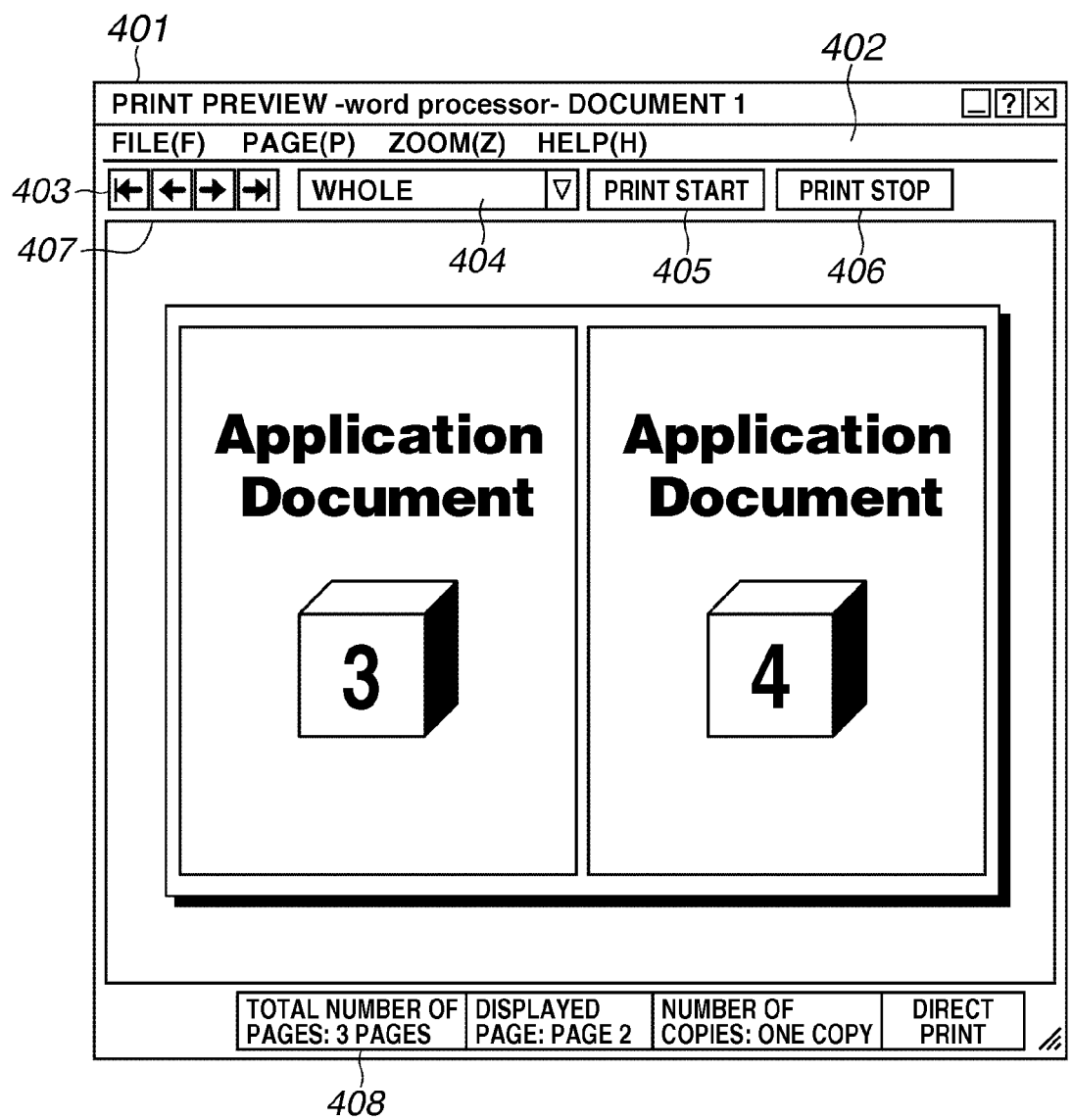
FIG. 4 illustrates a preview window according to an exemplary embodiment of the present invention.

FIG. 4 illustrates an exemplary display screen (preview window) provided by the preview control module 219. A print preview window 401 includes a plurality of display areas that display a preview image and print settings of a print job. The print preview window 401 includes an input unit that enables a user to change a method for displaying a preview image.

A menu bar 402 has a menu format that enables a user to select a command to be input to a previewer (e.g., switching of display). A tool bar includes user operation fields 403 to 406. A user can easily perform switching of a preview page by operating the fields 403 to 406 in the tool bar (without using the menu bar 402). A page switching button 403 is composed of four direction buttons, which enable a user to switch a preview display to the top page, the previous page, the next page, or the last page. A drop-down list 404 enables a user to select a desirable display size of a preview image, e.g., whole, 100%, 200%, etc.

A user can press a PRINT START button 405 to deactivate the previewer and bring the preview XPS document into a print processable state. A user can press a PRINT STOP button 406 to deactivate the previewer and cancel the print job if generation of the preview XPS document is incomplete. A preview display area 407 can display a print image (visible image) to be formed on a print sheet based on the contents of the preview XPS file.

A display area 408 displays setting values relating to representative print setting items of the print job (i.e., an object of the preview processing). According to the illustrated example, the total number of pages of document to be printed is three pages. The number of presently previewed pages is two. The number of copies according to the print settings is one copy. Further, a direct print is designated.

The display screen illustrated in FIG. 4 is displayed when the print setting information included in a spooled print job indicates that the preview setting is ON, when the print support function of the OS activates the filter pipeline 207, and when the preview filter 215 activates the preview control module 219.

An ordinary printer cannot print a plurality of documents simultaneously. Therefore, the OS has a logical queue (i.e., print queue) that manages a plurality of print jobs to be processed by the same printer. The queue has a front print job whose processing state is "printing." The front print job becomes a processing object of the printer driver.

FIGS. 7A to 7F are examples illustrating a relationship between a print queue and a preview of print jobs according to an exemplary embodiment. According to print setting information of the print jobs illustrated in FIGS. 7A to 7F, the preview setting is set to ON for Job A and Job B.

Figure 7A:
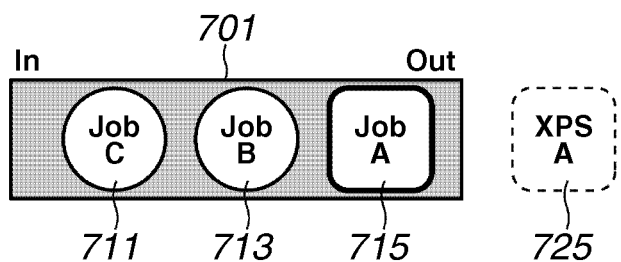
FIGS. 7A to 7F illustrate a relationship between print jobs in a print queue and a preview according to an exemplary embodiment of the present invention.

FIG. 7A illustrates a print queue 701 including three print jobs, in which the front print job (Job A 715) is in a "printing" state, and two succeeding jobs (Job B 713 and Job C 711) are in a "waiting" state. As the preview setting for the Job A 715 is ON, the printing system generates a preview XPS document A 725. Upon completing the preview XPS document A 725, the printing system deletes the Job A 715 from the print queue as illustrated in FIG. 7B.

Figure 7B:
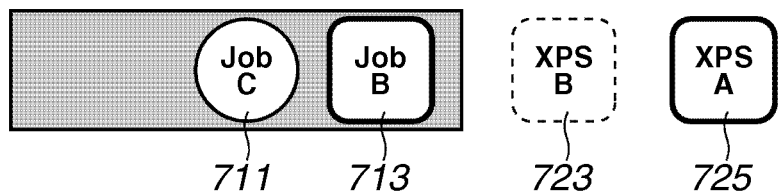

In a state illustrated in FIG. 7B, the printing system executes a preview of the preview XPS document A 725. The front print job (i.e., Job B 713) of the print queue is in a "printing" state. As the preview setting of Job B 713 in ON, the printing system generates a preview XPS document B 723. At this moment, the printing system simultaneously executes a preview of the preview XPS document A 725 and a preview of the preview XPS document B 723. This is useful for a single user who requires a preview of a plurality of print jobs or for a plurality of users who require simultaneous preview of print jobs. Upon completing the preview XPS document A 723, the printing system deletes the Job B 713 from the print queue as illustrated in FIG. 7C.

Figure 7C:
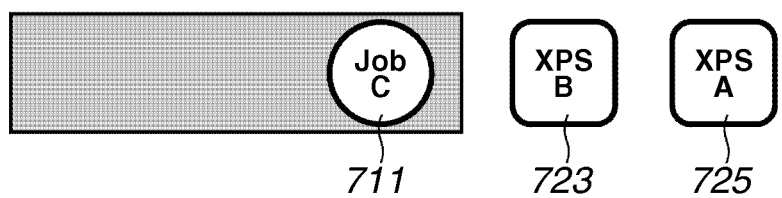

In a state illustrated in FIG. 7C, the printing system simultaneously executes a preview of the preview XPS document A 725 and a preview of the preview document B 723. The front print job (i.e., Job C 711) of the print queue is in a "printing" state. As the preview setting of Job C 711 in OFF, the printing system does not execute preview processing. The filter pipeline 207 generates a print command that is interpretable by the printer 231. The printer 231 forms an image on a print sheet. The print processing speed of a general printer is slow. On the other hand, the application requires a relatively short time to perform print processing of a document and to spool print data.

While the printer 231 prints the contents of Job C 711, a user may instruct initiating a print of the preview XPS document A 725. In this case, the preview control module 219 adds a new print job to the queue and stores the contents of the preview XPS document A 725 into the XPS spool file 205, as illustrated in FIG. 7D.

Figure 7D:
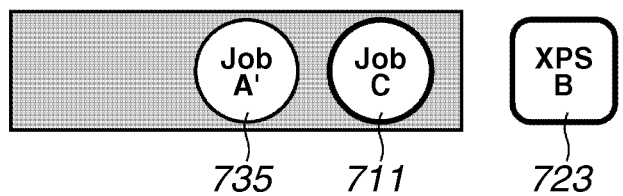

In a state illustrated in FIG. 7D, the printing system executes a preview of the preview document B 723. The front print job (i.e., Job C 711) of the print queue is in a "printing" state. The printer 231 continues the print processing. Job A' 735, i.e., a print job newly generated to continue the print of the preview XPS document A 725 is in a "waiting" state. Upon completing the print processing of Job C 711, the printing system deletes the Job B 711 from the print queue as illustrated in FIG. 7E.

Figure 7E:
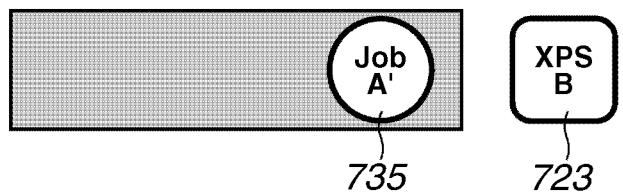

In a state illustrated in FIG. 7E, the printing system executes a preview of the preview document B 723. The front print job (i.e., Job A' 735) of the print queue is in a "printing" state. The Job A' 735 is an already previewed print job as readily understood by referring to the preview completion flag stored in the print settings as described above.

Accordingly, the printing system does not execute a preview of Job A' 735. The filter pipeline 207 generates a print command that is interpretable by the printer 231. The printer 231 forms an image on a print sheet. Upon terminating the print processing of Job A' 735, the printing system deletes the Job A' 735 from the print queue as illustrated in FIG. 7F.

Figure 7F:
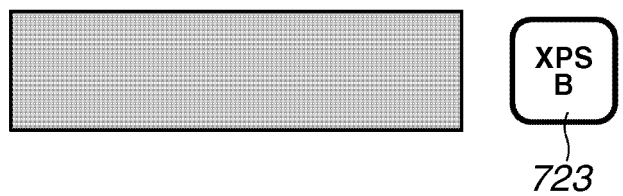

In a state illustrated in FIG. 7F, the printing system executes a preview of the preview document B 723. The print queue does not store any print job.

As described above, the printing system according to an exemplary embodiment can simultaneously display a plurality of preview images and perform an actual print of a print job included in a print queue while providing the preview function.

According to an exemplary embodiment, a newly generated print job is added to the rear of the print queue. However, the print support function of the OS can add a new print job to anywhere in the print queue. For example, a new print job can be added to the front of the print queue as a print job preceding the existing print jobs.

In a case where a new print job can be freely added to anywhere in the print queue, the preview control module 219 can select an optimum position and store the new print job to the selected position. For example, when the print jobs stored in the print queue are XPS documents, estimating the processing time of a printer that prints the print jobs is feasible by acquiring information about the total number of pages and the size of each job.

Hence, at the time a new print job is added, the preview control module 219 can select an optimum position to minimize an average waiting time estimated for a printing operation of all print jobs stored in the print queue. Furthermore, the user interface can be configured to allow a user to select a desired position for a new print job in the print queue. As described above, a new print job can be arbitrarily stored anywhere in the print queue.

An exemplary preview completion flag stored in a PT is described below with reference to FIGS. 6A and 6B. As described above, the PT includes print settings described according to the XML format. Therefore, the contents of the PT can be visually expressed as text (refer to FIG. 6A).

The PT illustrated in FIG. 6A describes exemplary print settings including designation of a 2-up layout. The "PrintSchema" regulates the standard description contents of the PT, including the setting items relating to the N-up layout. The PrintSchema is a publicly opened schema. The N-up settings involved in the PT include JobNUpAllDocumentsContiguously having an effect on the FDS and DocumentNUp having an effect on the FD, which are regulated by the PrintSchema. The printer driver exclusively handles these print settings, although the priorities given to them are dependent on each printer driver. According to the present embodiment, the 2-up layout is designated to each of these print settings.

The print settings include other setting items, although an exemplary embodiment describes only the N-up layout. Some of the setting items can have an effect on the FP as well as on the FDS and the FD.

FIG. 6B illustrates an exemplary PT including a preview completion flag added to the PT illustrated in FIG. 6A. The preview completion flag in the PT is unique information that is not regulated by the PrintSchema and requires addition of a private name space. In FIG. 6B, a private name space prefix is "ns0000." The preview completion flag expresses a Property value using a framework of the PrintSchema. The preview completion flag includes expressions relating to Property name attribute "ns000:PreviewFilterProcess" and string value "Done." If the PT does not include the Property name attribute "ns0000:PreviewFilterProcess", or if the value of "ns0000:PreviewFilterProcess" is not "Done", it can be determined that the preview is not executed.

Although the Property of the framework is used to store the preview completion flag according to the examples illustrated in FIGS. 6A and 6B, Feature/Option can be also used. It is also useful to prepare a private name space indicating a preview completion flag so that the presence of the name space can express the preview completion flag. As the PT is described according to the XML format, any other expression complying with the PrintSchema can be used to store the preview completion flag.

Each filter of the filter pipeline 207 is required to merge the PT of the XPS as described above to acquire print setting information. Each part of an XPS document can include a PT or may not include a PT. Even if an XPS part includes a PT, the PT may be an imperfect PT that describes only N-up information as illustrated in FIG. 6A. Therefore, it is necessary to merge a PT of the FDS with the PT including user's default print settings. The PT of default print settings includes all setting items that the printer driver can manage. Accordingly, the merged PT includes all print setting items.

Figure 9:
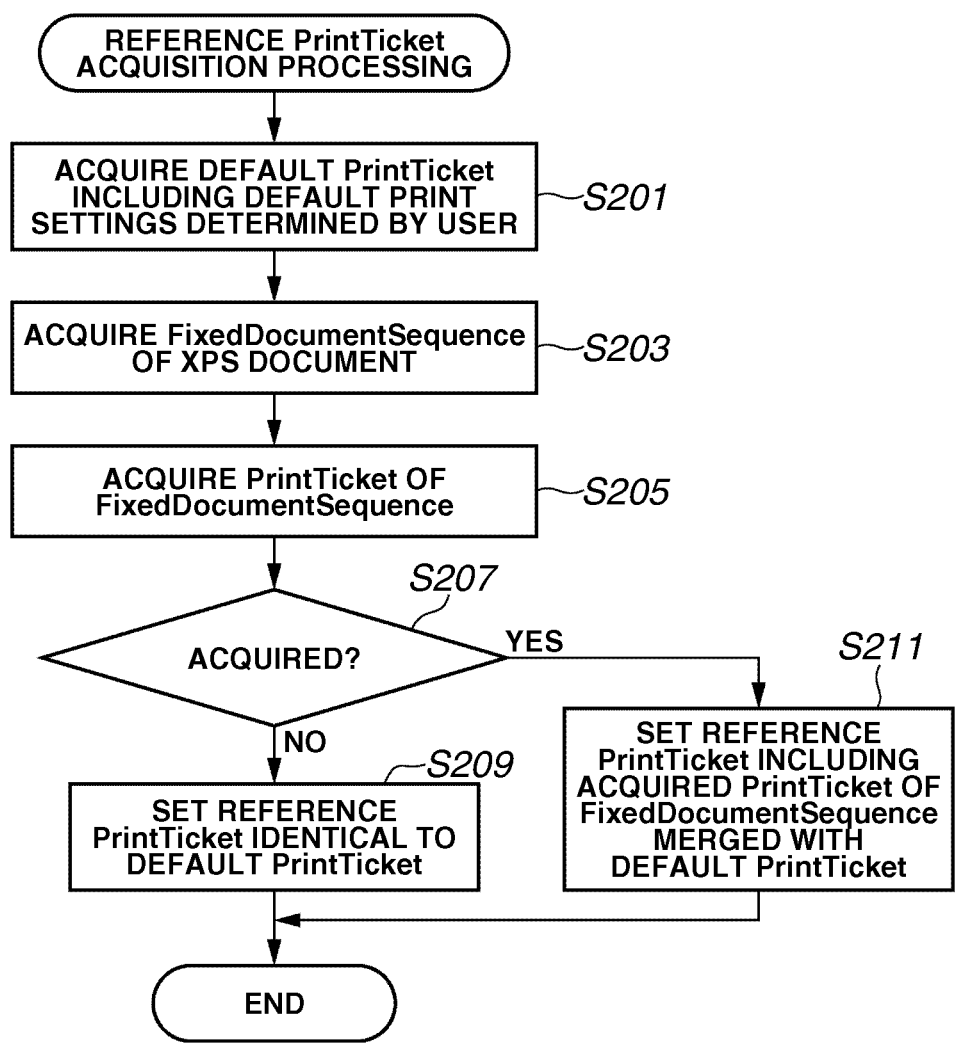
FIG. 9 is a flowchart illustrating an example of reference PrintTicket acquisition processing according to an exemplary embodiment of the present invention.

FIG. 9 is a flowchart illustrating an example of reference PrintTicket acquisition processing according to an exemplary embodiment of the present invention. FIG. 9 illustrates exemplary processing for merging a PT of an FDS with a PT of user's default print settings to acquire a reference PT. A central processing unit (CPU) of the central control unit 141 executes a program relating to the flowchart of FIG. 9, which can be loaded into a random access memory (RAM) of the storage unit 144 from a hard disk drive of the storage unit 144 of the data processing apparatus 102.

In step S201, the program acquires a default PT including default print settings determined by a user. In step S203, the program acquires an FDS of an XPS document. In step S205, the program acquires a PT of the FDS. In step S207, the program determines whether the PT of the FDS has been acquired. If the PT of the FDS has been acquired (YES in step S207), the processing flow proceeds to step S211. If the PT of the FDS has not been acquired (NO in step S207), the processing flow proceeds to step S209. In step S211, the program sets a reference PT that includes the acquired PT of the FDS merged with the default PT. Then, the program terminates the processing of this routine. In step S209, the program sets a reference PT that is identical to the default PT. Then, the program terminates the processing of this routine.

The above-described "all print setting items" include setting items that an application can set and do not include a preview completion flag (i.e., setting items in a printer driver). The processing illustrated in FIG. 9 can acquire a reference PT including all setting items that the printer driver can manage.

Exemplary processing of the layout filter 213 is described below with reference to FIG. 8. FIG. 8 is a flowchart illustrating an example of the layout filter processing. The CPU of the central control unit 141 executes a program relating to the flowchart of FIG. 8, which can be loaded into the RAM of the storage unit 144 from the hard disk of the storage unit 144 of the data processing apparatus 102.

In step S101, the layout filter 213 acquires a reference PT as described above. In step S103, the layout filter 213 determines whether the reference PT includes a preview completion flag. If the reference PT includes the preview completion flag (YES in step S103), the processing flow proceeds to step S121. If the reference PT does not include the preview completion flag (NO in step S103), the processing flow proceeds to step S105.

In step S105, the layout filter 213 acquires an FD. In step S107, the layout filter 213 acquires a PT of the FD. In step S109, the layout filter 213 determines whether the PT of the FD has been acquired. If the PT of the FD has been acquired (YES in step S109), the processing flow proceeds to step S111. If the PT of the FD has not been acquired (NO in step S109), the processing flow proceeds to step S113.

In step S111, the layout filter 213 merges the acquired PT of the FD with the reference PT. In step S113, the layout filter 213 determines whether print setting information of the reference PT includes layout processing settings. If the print setting information includes the layout processing settings (YES in step S113), the processing flow proceeds to step S141. If the print setting information does not include the layout processing settings (NO in step S113), the processing flow proceeds to step S131.

The layout filter 213 executes sequential processing of steps S131 to S135 to directly output the input XPS data to the preview filter 215 without executing the layout processing. In step S131, the layout filter 213 transmits the acquired FDS to the preview filter 215. In step S133, the layout filter 213 transmits the acquired FD to the preview filter 215. In step S135, the layout filter 213 successively acquires remaining XPS parts from the input and transmits the acquired XPS parts to the preview filter 215. Then, the layout filter 213 terminates the processing of this routine.

The layout filter 213 executes sequential processing of steps S141 to S145 to perform the layout processing on the input XPS data and to output the processed data to the preview filter 215. In step S141, the layout filter 213 transmits the acquired FDS to the preview filter 215. In step S143, the layout filter 213 transmits the acquired FD to the preview filter 215. In step S145, the layout filter 213 successively acquires remaining XPS parts from the input, generates a layout-completed FP (i.e., an FP having been subjected to the layout processing), and transmits the layout-completed FP to the preview filter 215.

As described above, the PT includes layout settings having an effect on the FDS and layout settings having an effect on the FD. Therefore, the layout filter 213 transmits the FD (if required) to the preview filter 215. After all the FPs including the newly generated layout-completed FP are transmitted to the preview filter 215, the layout filter 213 terminates the processing of this routine.

In a sequential procedure of steps S121 and S123, the layout filter 213 does not execute layout processing because a preview-completed print job has been already subjected to the layout processing. In step S121, the layout filter 213 transmits the input FDS to the preview filter 215. In step S123, the layout filter 213 successively acquires remaining XPS parts from the input and transmits the acquired XPS parts to the preview filter 215. Then, the layout filter 213 terminates the processing of this routine. Thus, the XPS data is transmitted to the next filter (the preview filter 215).

In this manner, an exemplary embodiment refers to a preview completion flag involved in a PT and can prevent the same layout processing from being repeatedly executed after performing a preview.

Figure 10:
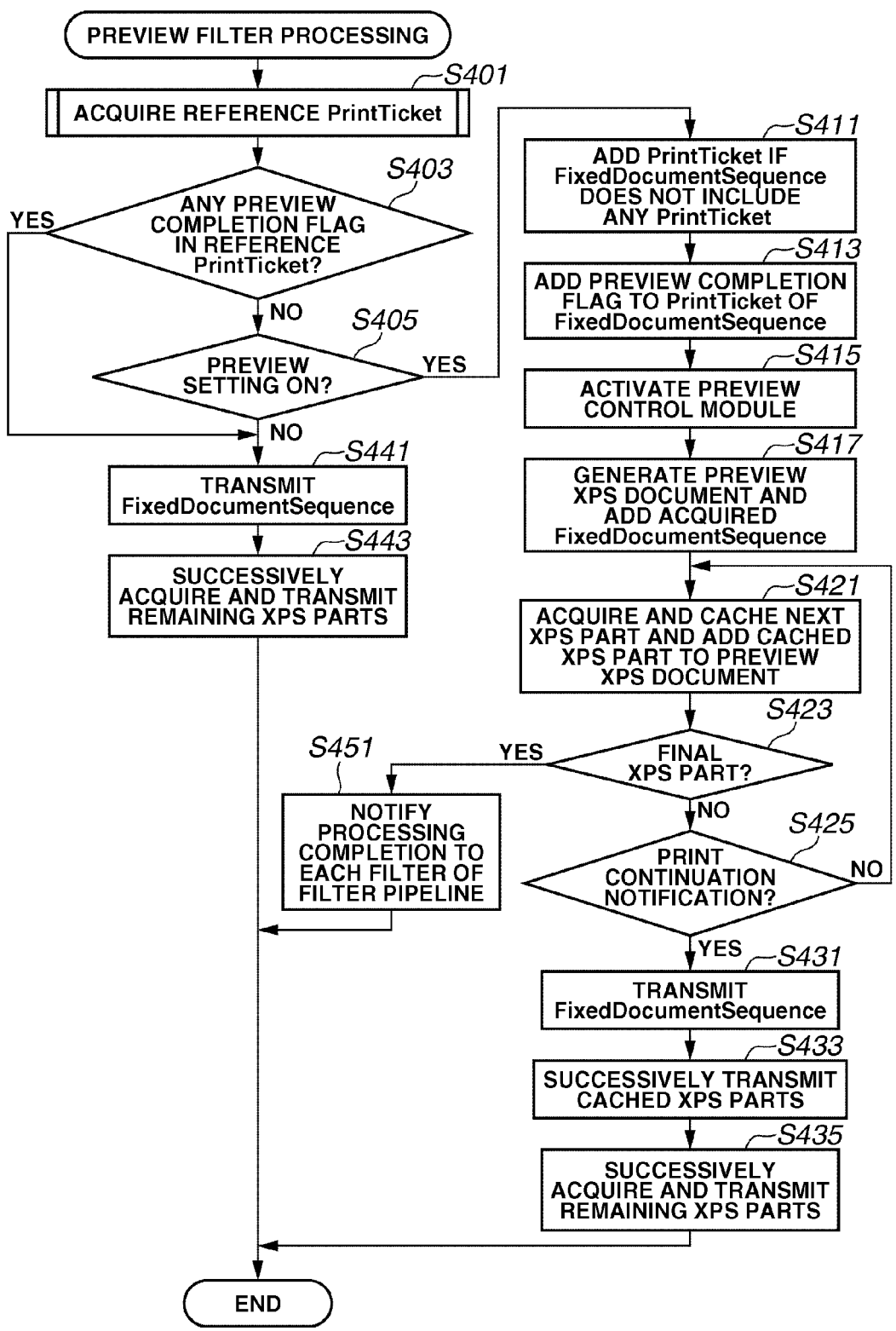
FIG. 10 is a flowchart illustrating an example of preview filter processing according to an exemplary embodiment of the present invention.

FIG. 10 is a flowchart illustrating exemplary processing of the preview filter 215. The CPU of the central control unit 141 executes a program relating to the flowchart of FIG. 10, which can be loaded into the RAM of the storage unit 144 from the hard disk of the storage unit 144 of the data processing apparatus 102.

In step S401, the preview filter 215 acquires a reference PT as described above. In step S403, the preview filter 215 determines whether the reference PT includes a preview completion flag. If the preview completion flag is included (YES in step S403), the processing flow proceeds to step S441. If the preview completion flag is not included (NO in step S403), the processing flow proceeds to step S405.

In step S405, the preview filter 215 determines whether the preview setting (i.e., print setting information) of the reference PT is ON. If the preview setting of the reference PT is not ON (NO in step S405), the processing flow proceeds to step S441. If the preview setting is ON (YES in step S405), the processing flow proceeds to step S411.

The preview filter 215 executes sequential processing of steps S411 through S425 to generate a preview XPS document. In step S411, the preview filter 215 adds a PT to the acquired FDS if the FDS does not include any PT. In step S413, the preview filter 215 adds a preview completion flag to the PT of the FDS. In step S415, the preview filter 215 activates the preview control module 219.

In step S417, the preview filter 215 generates a preview XPS document and adds the acquired FDS. The preview XPS document includes an XPS document having been subjected to the layout processing and a preview-completion flag added to this preview XPS document. In step S421, the preview filter 215 acquires the next XPS part from the input and caches the acquired XPS part. Then, the preview filter 215 adds the cached XPS part to the preview XPS document.

In step S423, the preview filter 215 determines whether the acquired XPS part is the final part. If the acquired XPS part is the final part (YES in step S423), the processing flow proceeds to step S451. If the acquired XPS part is not the final part (NO in step S423), the processing flow proceeds to step S425. In step S451, the preview filter 215 does not output any XPS data and transmits a notification of terminating the processing to each filter of the filter pipeline 207. Thus, the print job is deleted from the print queue.

In step S425, the preview filter 215 determines whether a print continuation notification is received from the preview control module 219. If the print continuation notification is not received (NO in step S425), the processing flow returns to step S421 to continue generating the preview XPS document. If the print continuation notification is received (YES in step S425), the processing flow proceeds to step S431.

The preview filter 215 executes sequential processing of steps S431 to S435 when a user instructs initiating a print operation before the preview XPS document is completely generated. In step S431, the preview filter 215 transmits the acquired FDS to the print command filter 217.

In step S433, the preview filter 215 successively transmits the cached XPS parts to the print command filter 217. In step S435, the preview filter 215 successively acquires remaining XPS parts from the input and transmits the acquired XPS parts to the print command filter 217. Then, the preview filter 215 terminates the processing of this routine.

In a sequential procedure of steps S441 and S443, the preview filter 215 does not execute preview processing because a preview-completed print job has been already subjected to the preview processing. In step S441, the preview filter 215 transmits the input FDS to the print command filter 217. In step S443, the preview filter 215 successively acquires remaining XPS parts from the input and transmits the acquired XPS parts to the print command filter 217. Then, the preview filter 215 terminates the processing of this routine. Thus, the XPS data is transmitted to the next filter (the print command filter 217).

In the above-described processing, the preview filter 215 caches the input XPS parts while generating the preview XPS document. If the print continuation notification is received before completing the preview XPS document, the preview filter 215 outputs the cached XPS document to the print command filter 217. However, the preview filter 215 may not cache the XPS parts. In this case, the preview filter 215 reads XPS parts from the preview XPS document being currently generated and outputs the read XPS parts to the print command filter 217.

The above-described processing can store a preview completion flag in a preview XPS file and can output XPS data to generate a print command according to a print start instruction even if generation of the preview XPS file is not completed. Furthermore, the above-described processing can prevent preview-completed XPS data from being previewed again.

Figure 11:
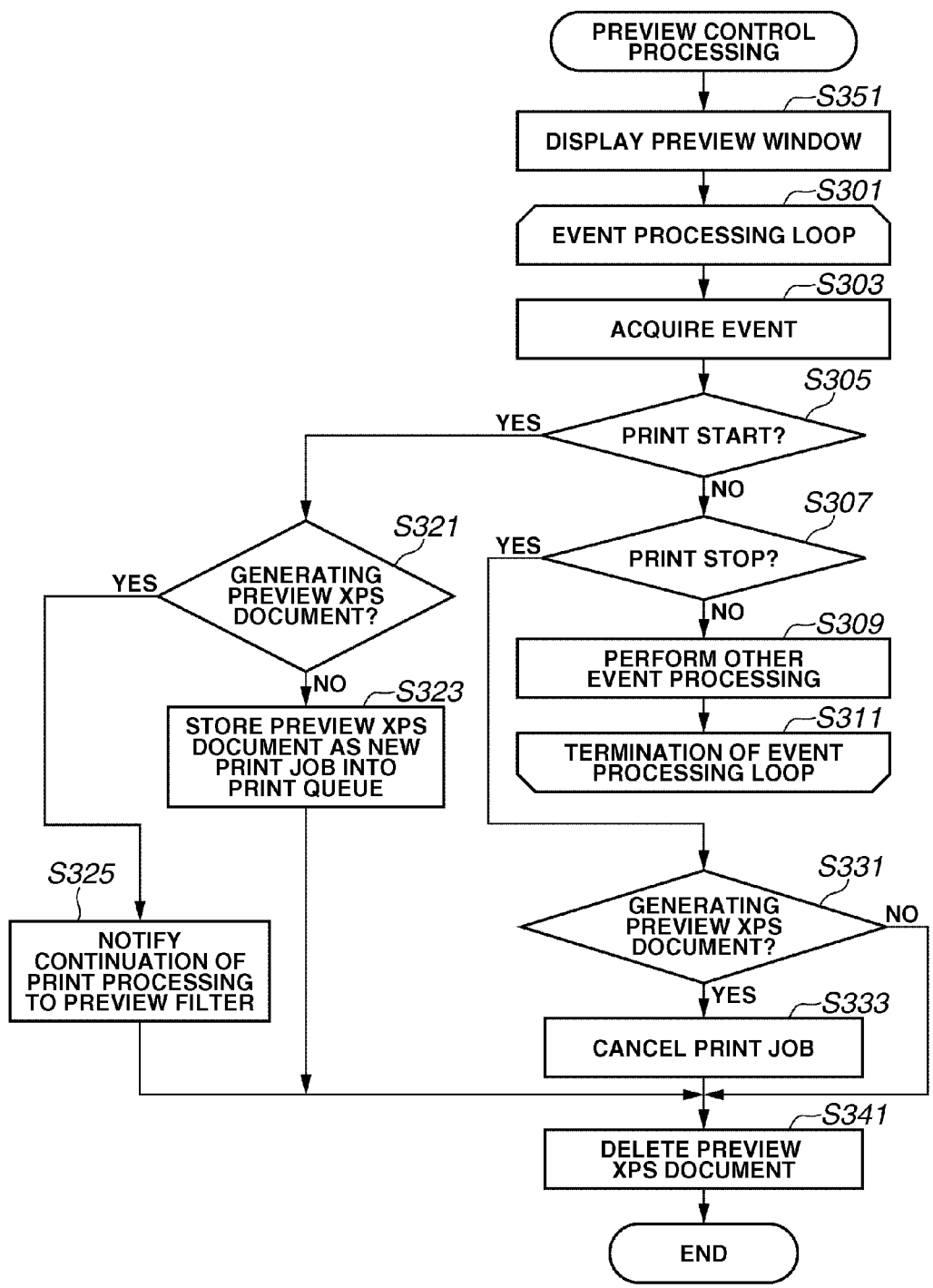
FIG. 11 is a flowchart illustrating an example of preview control module processing according to an exemplary embodiment of the present invention.

FIG. 11 is a flowchart illustrating exemplary processing of the preview control module 219. In step S351, the preview control module 219 displays the above-described preview window. The CPU of the central control unit 141 executes a program relating to the flowchart of FIG. 11, which can be loaded into the RAM of the storage unit 144 from the hard disk of the storage unit 144 of the data processing apparatus 102.

A sequential procedure of steps S301 to S311 is an event processing loop. Step S301 is a start terminal of the event processing loop. In step S303, the preview control module 219 acquires an event. In step S305, the preview control module 219 determines whether the event is print start (i.e., a print instruction). If the event is the print start (YES in step S305), the processing flow proceeds to step S321. If the event is not the print start (NO in step S305), the processing flow proceeds to step S307.

In step S307, the preview control module 219 determines whether the event is print stop. If the event is the print stop (YES in step S307), the processing flow proceeds to step S331. If the event is not the print stop (NO in step S307), the processing flow proceeds to step S309.

In step S309, the preview control module 219 performs event processing other than the print start and the print stop. For example, as described above with reference to FIG. 4, if the event generated via the preview window is switching of a page to be displayed, the preview control module 219 again draws the contents of the preview display area of the preview window. Furthermore, in processing a timer event, the preview control module 219 can change the display of the number of spooled pages. In this manner, the preview control module 219 can perform various processing in step S309. Step S311 is a terminal end of the event processing loop. The processing flow returns to step S301.

When the event is the print start (YES in step S305), the preview control module 219 executes sequential processing of step S321 through step S325 (i.e., print start processing). In step S321, the preview control module 219 determines whether the preview filter 215 is currently generating a preview XPS document. If the preview filter 215 is currently generating the preview XPS document (YES in step S321), the processing flow proceeds to step S325. If the preview filter 215 has completely generated the preview XPS document (NO in step S321), the processing flow proceeds to step S323.

In step S325, the preview control module 219 notifies continuation of the print processing to the preview filter 215 because the previewed print job still remains in the print queue. Then, the processing flow proceeds to step S341. In step S323, the preview control module 219 adds a new print job to the print queue because the print job has already been deleted from the print queue. The preview control module 219 inputs the contents of the preview XPS document and outputs an XPS document of the new print job to the spool file 205. Then, the processing flow proceeds to step S341.

An exemplary print job generation procedure performed by the preview control module 219 is described below. First, the preview control module 219 notifies the OS of adding a print job and acquires a path of the XPS spool file 205 from the OS. Next, the preview control module 219 copies the contents of a preview XPS document corresponding to the print job to the XPS spool file 205. Next, the preview control module 219 requests the OS to schedule the added print job.

When the event is the print stop (YES in step S307), the preview control module 219 executes sequential processing of steps S331 and S333 (i.e., print cancellation processing). In step S331, the preview control module 219 determines whether the preview filter 215 is currently generating a preview XPS document. If the preview filter 215 is currently generating the preview XPS document (YES in step S331), the processing flow proceeds to step S333. If the preview filter 215 has completely generated the preview XPS document (NO in step S331), the processing flow proceeds to step S341.

In step S333, the preview control module 219 cancels the print job because the previewed print job still remains in the print queue. When the preview filter 215 has completely generated the preview XPS document, the previewed print job does not remain in the print queue. Thus, the preview control module 219 skips the processing of step S333. In step S341, the preview control module 219 deletes the preview XPS document and terminates the processing of this routine.

In this manner, if any print job is present during a preview operation, the printer can promptly start a print operation according to a user's print start instruction. Furthermore, as the preview XPS document of each original print job is stored, a plurality of preview functions can be simultaneously provided.

As described above, an exemplary embodiment can obtain the following effects: (1) even if a user instructs print start via the previewer, the printing system does not perform the same layout processing again and can reduce the processing load of a computer; and (2) if generation of the preview XPS document is terminated, the printing system can process a succeeding print job in the print queue during a preview of the preceding job.

Second Exemplary Embodiment

According to the first exemplary embodiment, in continuously performing an actual print operation after a print preview, the printing system can directly use the layout processing-completed preview XPS document generated during the print preview. Therefore, in the actual print operation, the printing system performs only limited processing required for the layout processing-completed preview XPS document. Thus, the printing system is not required to perform the same layout processing for the print preview and the actual print processing.

On the other hand, there is a conventional system that processes (modifies) the contents to be displayed before displaying a preview image for the purpose of letting a user confirm print contents beforehand or check the presence of any print error. For example, as described above, the CD-R area display function is usable to add a border line identifying the inside and outside areas of a CD-R disk on a print image generated for the print preview, to perform density adjustment processing, and to display a processed print image. In the case of a printer driver capable of processing an XPS document, to realize the CD-R area display function, the preview control module 219 processes a print image on each page of a preview XPS document.

Therefore, if the CD-R area display function is realized by the printing system according to the first exemplary embodiment, the printer continues an actual print operation using a processed preview XPS document. Thus, an image of a CD-R area does not disappear from an actual print result.

Furthermore, according to a second exemplary embodiment, if the preview control module 219 processes (modifies) a print image on each page of a preview XPS document in performing a preview display, the printing system continues an actual print operation after the print image of each page is restored to its original (unprocessed) state.

The portions already described in the first exemplary embodiment, e.g., the illustrations in FIGS. 1 and 2, are not described below. Instead of using the processing illustrated in FIG. 11 (which is exclusively performed for the first exemplary embodiment), the second exemplary embodiment executes the processing illustrated in FIG. 15.

More specifically, the preview control module 219, when activated by the preview filter 215, reads the preview XPS document 221 and performs preview display processing for displaying a preview image of a page (e.g., first page) as described below. Similarly, the preview control module 219 performs the preview display processing for switching a page displayed according to a user's instruction.

Furthermore, the preview control module 219 performs preview XPS document reset processing (as described below) if a print start instruction is received from a user after the preview XPS document 221 is completed. Then, the preview control module 219 generates a new print job based on the data of the preview XPS document 221 and terminates the processing.

Next, exemplary preview display processing performed by the preview control module 219 according to the second exemplary embodiment is described below.

First, the preview control module 219 acquires print setting information (PT) of a page to be previewed from the preview XPS document. Next, referring to the acquired PT, the preview control module 219 determines whether the print setting of a page to be previewed is a CD-R print. If the print setting is the CD-R print, the preview control module 219 processes a print image for the display of a CD-R area. For example, the preview control module 219 adds a drawing command to an FP, for drawing a border line that defines a portion corresponding to the inside of a CD-R and a portion corresponding to the outside of the CD-R or a drawing command for decreasing the density of an image positioned outside the CD-R. Then, the preview control module 219 displays the processed print image as a print preview image.

The preview XPS document reset processing performed by the preview control module 219 according to the present embodiment is described below.

First, the preview control module 219 acquires each FP from the preview XPS document. Next, the preview control module 219 determines whether the acquired FP includes a drawing command added for the CD-R area display. If the FP includes the drawing command added for the CD-R area display, the preview control module 219 deletes the drawing command.

Figure 12:
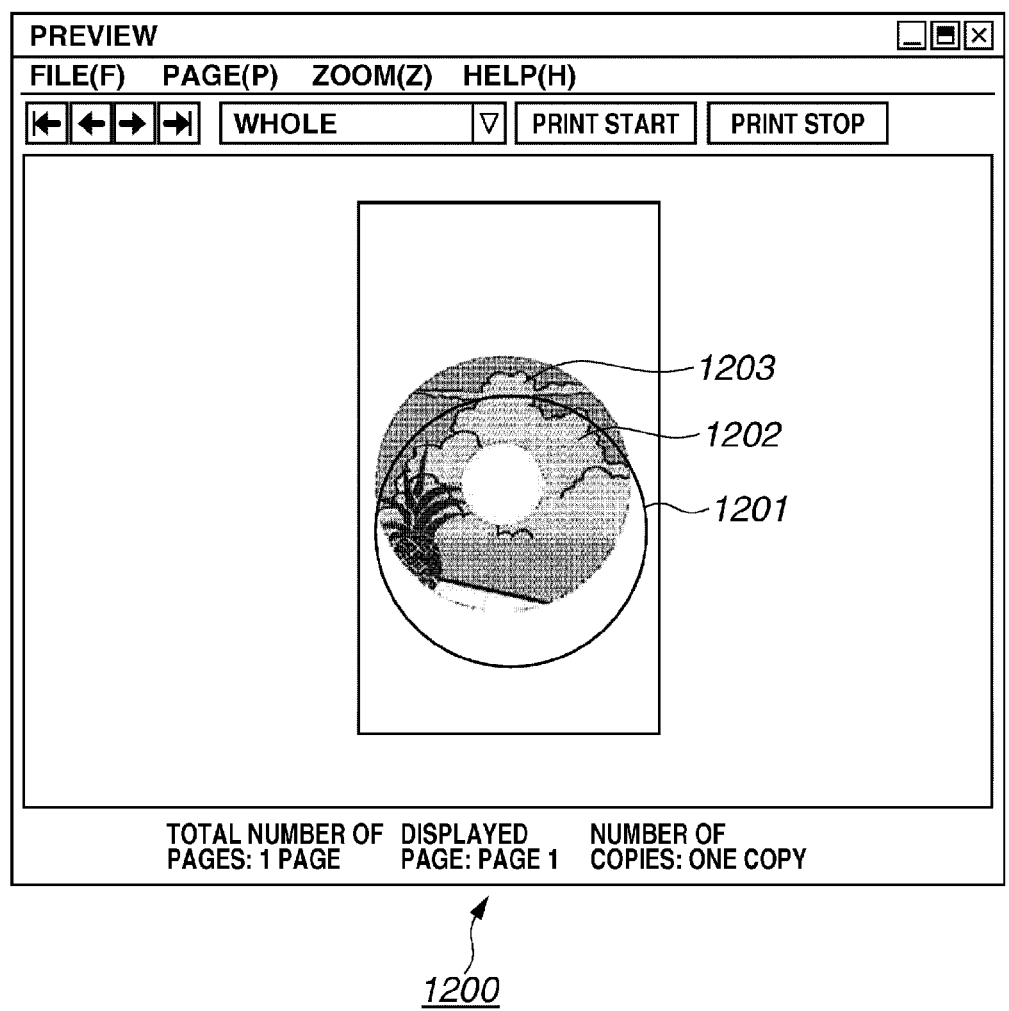
FIG. 12 illustrates a print preview screen that includes a CD-R area display according to a second exemplary embodiment of the present invention.

FIG. 12 illustrates an exemplary print preview screen 1200 that realizes the CD-R area display provided by the preview control module 219 according to an exemplary embodiment. A print image includes a border "1201" that defines an inside area "1202" of the CD-R and an outside area "1203" of the CD-R. The print image of the outside area "1203" has a lower density compared to the print image of the inside area "1202."

FIGS. 13A and 13B illustrate exemplary drawing commands for the CD-R area display added by the preview control module 219 according to an exemplary embodiment. As described above, the FP includes document contents of one page described according to the XML format. Accordingly, the contents of the PT can be visually expressed as text (refer to FIG. 13A).

FIG. 13A illustrates an example of the FP included in the preview XPS document 221 that has been subjected to the layout processing performed by the layout filter 213 and stored by the preview filter 215.

FIG. 13B illustrates an example of the FP that includes a drawing command added to perform the CD-R area display on a print image of the FP illustrated in FIG. 13A. According to the example illustrated in FIG. 13B, attribute information belonging to a private name space is added to each drawing command, so that the preview control module 219 can identify the added drawing command.

More specifically, the root element of the FixedPage declares a private name space whose prefix is "ns0000", defines "ns0000:owner" attribute belonging to this name space as attribute information of each drawing command, and designates the "Previewer" as an attribute value. Accordingly, the preview control module 219 can be identified as a creator of the drawing command. The method for identifying the drawing command is not limited to the above-described method.

FIG. 14 illustrates an example of the PT that includes CD-R print settings. The standard contents described in the PT, which are regulated by the PrintSchema, include setting items relating to "type of sheet", "sheet feeding method", and "sheet size." The PrintSchema defines that the "psf:Feature" element whose "name" attribute value is "psf:PageMediaType" is "type of sheet."

According to the CD-R media settings illustrated in FIG. 14, the "psf:Option" element is a child element of the above-mentioned "psf:Feature" element. The "name" attribute value of the "psf:Option" element is "ns0000:Disc."

Figure 15:
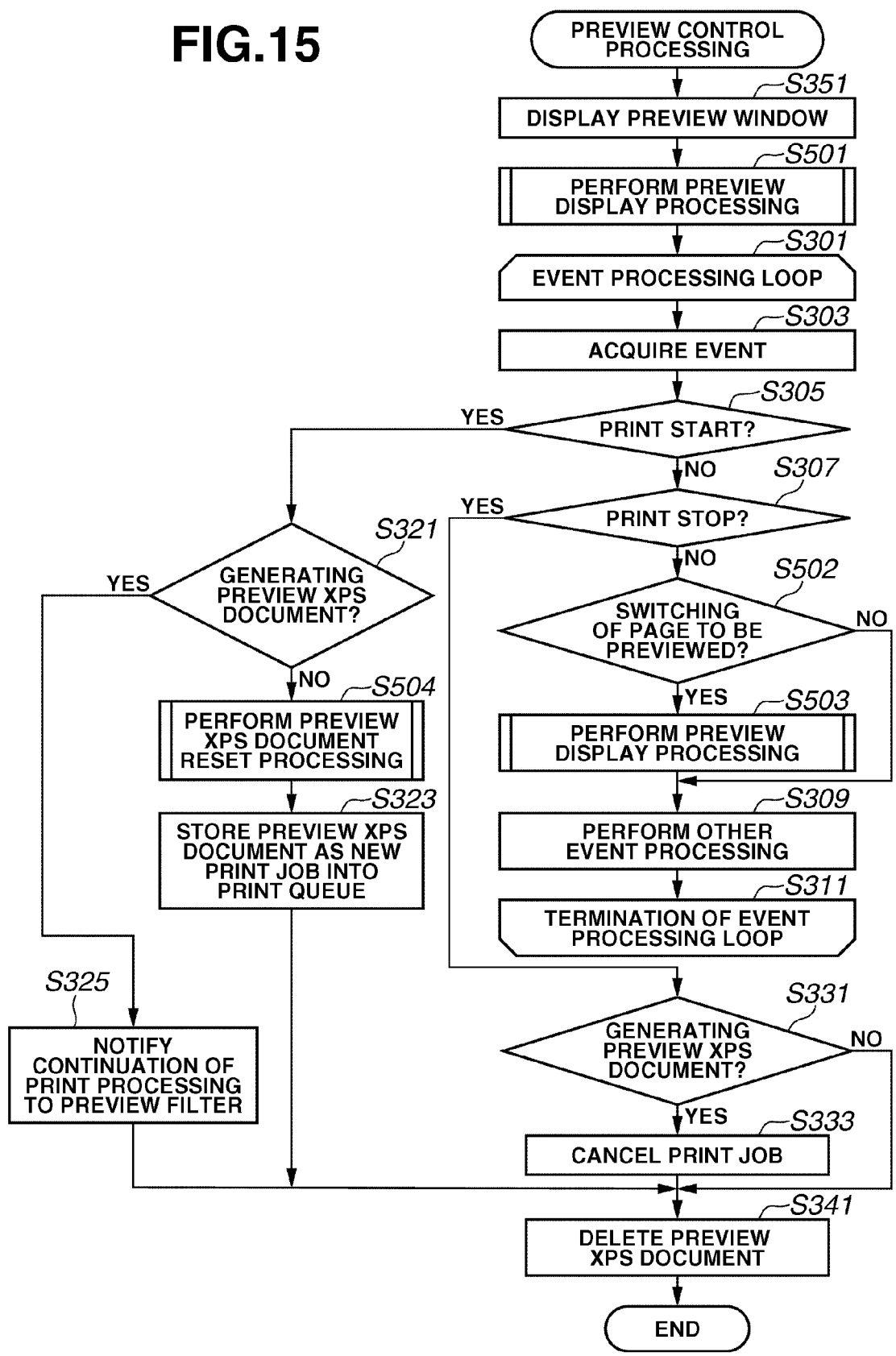
FIG. 15 is a flowchart illustrating an example of preview control module processing according to the second exemplary embodiment of the present invention.

FIG. 15 is a flowchart illustrating exemplary processing performed by the preview control module 219 according to an exemplary embodiment. The flowchart of FIG. 15 includes processing steps similar to those described in FIG. 11 (the first exemplary embodiment). Therefore, the same step numbers are used.

In step S501, the preview control module 219 performs preview display processing (described below in more detail) to display a print preview of a page to be displayed (e.g., first page). In step S502, the preview control module 219 determines whether the event acquired in step S303 is switching of a page to be previewed.

If the preview control module 219 determines that the event acquired in step S303 is switching of a page to be previewed (YES in step S503), the processing flow proceeds to step S503. If the preview control module 219 determines that the event acquired in step S303 is not switching of a page to be previewed (NO in step S503), the processing flow proceeds to step S309.

In step S503, the preview control module 219 performs preview display processing for displaying a print preview of a page designated by a user in the event acquired in step S303. In step S504, the preview control module 219 performs preview XPS document reset processing (described below in more detail) to restore the preview XPS document 221 to its original state.

Figure 16:
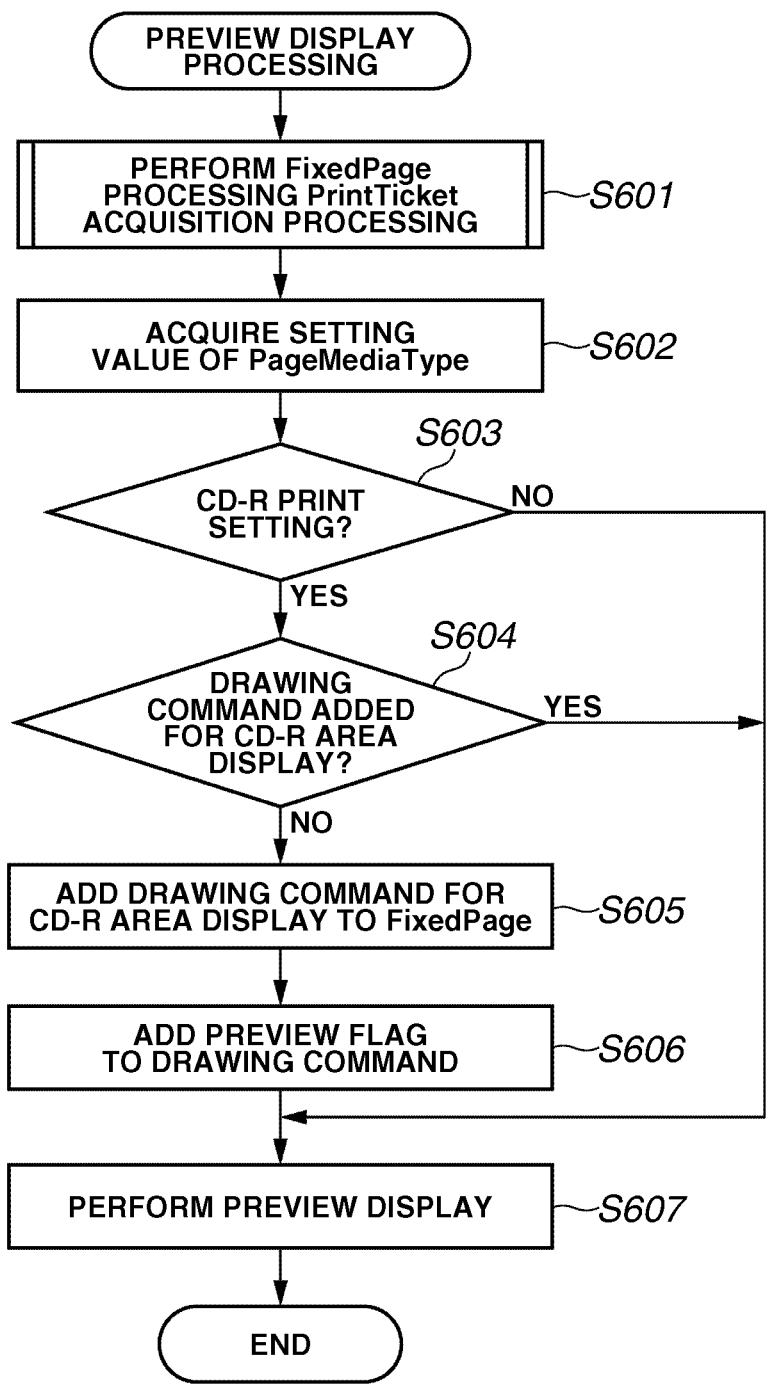
FIG. 16 a flowchart illustrating an example of preview display processing according to the second exemplary embodiment of the present invention.

FIG. 16 is a flowchart illustrating details of the preview display processing performed in steps S501 and S503 illustrated in FIG. 15. The CPU of the data processing apparatus 102 can execute each processing step illustrated in FIG. 16 according to a control program loaded into a memory from an external storage apparatus.

In step S601, the preview control module 219 performs FixedPage processing PrintTicket acquisition processing (described below in more detail) to acquire print setting information (PT) of a page to be previewed.

In step S602, the preview control module 219 acquires setting contents relating to the type of sheet referring to the PT acquired in step S601. More specifically, the preview control module 219 retrieves the "psf:Feature" element whose "name" attribute value is "psf:PageMediaType" and acquires contents of the "psf:Option" element (i.e., child element).

In step S603, the preview control module 219 refers to the "psf:Option" element acquired in step S602 and determines whether the type of sheet (setting) is CD-R. More specifically, the preview control module 219 determines whether the "name" attribute value of the "psf:Option" element is "ns0000:Disc" when the prefix of private name space is declared as "ns0000."

If the preview control module 219 determines that the type of sheet (setting) is CD-R (YES in step S603), the processing flow proceeds to step S604. If the preview control module 219 determines that the type of sheet (setting) is not CD-R (NO in step S603), the processing flow proceeds to step S607.

In step S604, the preview control module 219 refers to the FP of a page to be previewed and determines whether the FP includes a drawing command added for a CD-R highlight display. If the preview control module 219 determines that the FP includes the drawing command added for the CD-R highlight display (YES in step S604), the processing flow proceeds to step S605. If the preview control module 219 determines that the FP does not include the drawing command added for the CD-R highlight display (NO in step S604), the processing flow proceeds to step S607.

In step S605, the preview control module 219 adds a drawing command for the CD-R area display (i.e., drawing command unique to the preview display) to the FP of the page. In step S606, the preview control module 219 adds a preview flag (i.e., flag identifying that the creator of the drawing command is the preview control module 219) to the drawing command added in step S605. In step S607, the preview control module 219 performs a preview display based on the FP of the page. Then, the preview control module 219 terminates the processing of this routine.

The above-described processing is not limited to the drawing command for displaying an area of a CD-R disk and can also be applied to a drawing command for displaying grid lines or a scale or a drawing command for displaying a print area of an enlarged document image in a borderless print operation.

Figure 17:
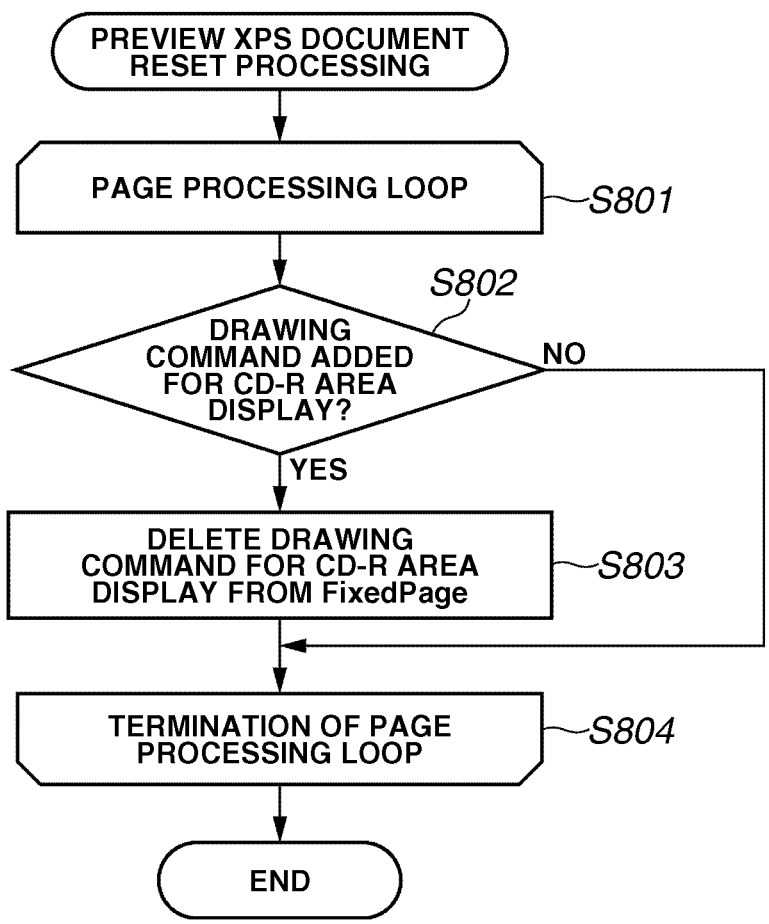
FIG. 17 is a flowchart illustrating an example of preview XPS document reset processing according to the second exemplary embodiment of the present invention.

FIG. 17 is a flowchart illustrating details of the preview XPS document reset processing performed in step S504 illustrated in FIG. 15. The CPU of the data processing apparatus 102 can execute each processing step illustrated in FIG. 17 according to a control program loaded into a memory from an external storage apparatus.

A sequential procedure of steps S801 to S804 is a page processing loop performed for each page included in the preview XPS document 221. Step S801 is a start terminal of the page processing loop. The processing of succeeding steps S802 to S803 is successively performed, from FP of a leading page, for all pages involved in the preview XPS document 221.

In step S802, the preview control module 219 determines whether the FP of the page includes the drawing command added for the CD-R area display. If the preview control module 219 determines that the FP of the page includes the drawing command added for the CD-R area display (YES in step S802), the processing flow proceeds to step S803. If the preview control module 219 determines that the FP of the page does not include the drawing command added for the CD-R area display (NO in step S802), the processing flow proceeds to step S804.

In step S803, the preview control module 219 deletes the drawing command for the CD-R area display from the FP of the page. Step S804 is a terminal end of the page processing loop. The page processing loop repeatedly returns to step S801 until the preview control module 219 completes the processing for the FP of the final page included in the preview XPS document 221. If the preview control module 219 has completed the processing for the FP of the final page, the preview control module 219 terminates the processing of this routine.

Figure 18:
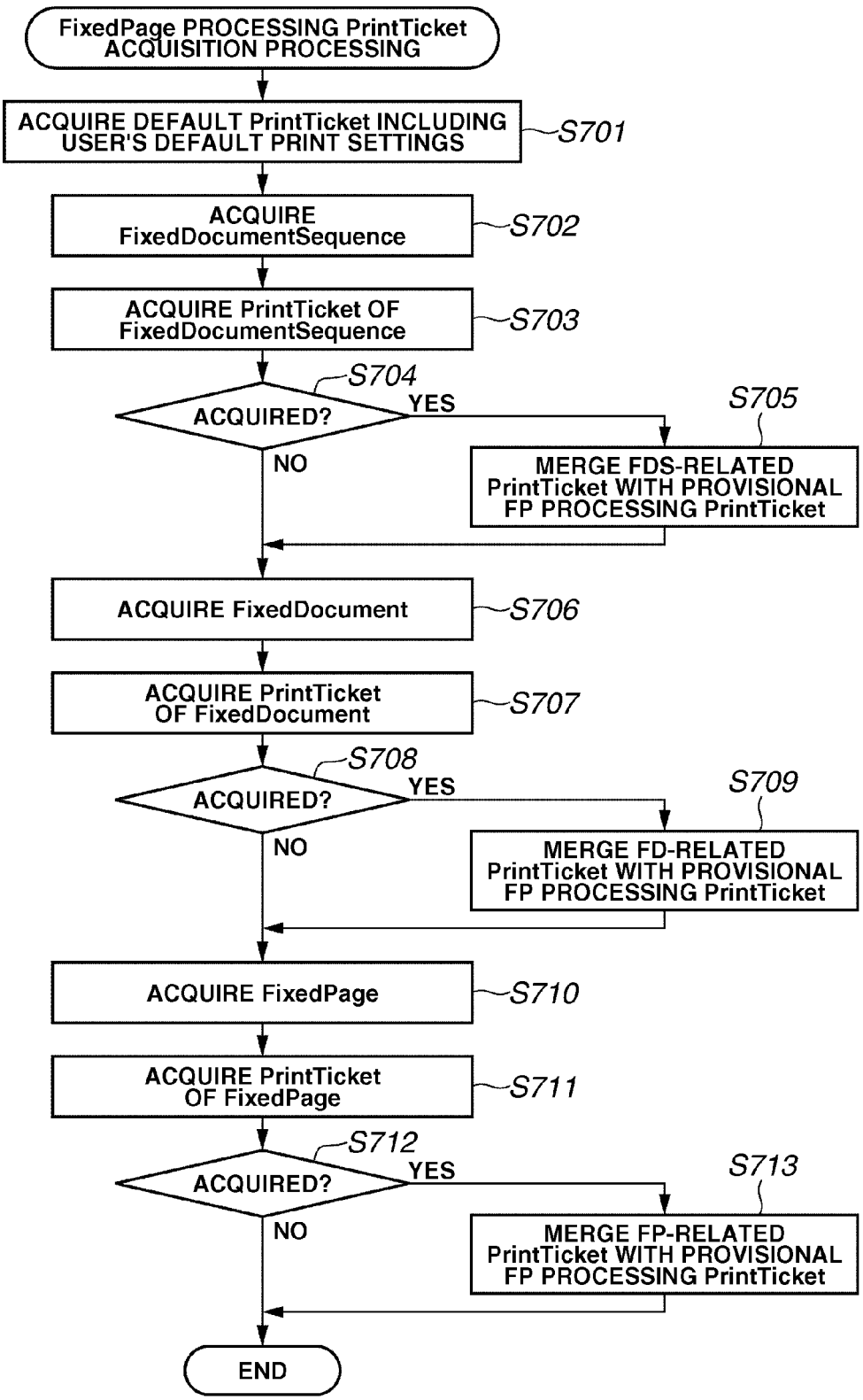
FIG. 18 is a flowchart illustrating an example of Fixedpage processing PrintTicket acquisition processing according to the second exemplary embodiment of the present invention.

FIG. 18 is a flowchart illustrating details of the FixedPage processing PrintTicket acquisition processing performed in step S601 illustrated in FIG. 16. The CPU of the data processing apparatus 102 can execute each processing step illustrated in FIG. 18 according to a control program loaded into a memory from an external storage apparatus.

In step S701, the preview control module 219 acquires a default PT that includes user's default print settings. The default PT acquired in step S701 is designated as a provisional FP processing PT. In step S702, the preview control module 219 acquires an FDS from the preview XPS document 221. In step S703, the preview control module 219 acquires a PT related to the FDS acquired in step S702. In step S704, the preview control module 219 determines whether the FDS-related PT has been acquired in step S703.

If the preview control module 219 determines that the PT related to the FDS has been acquired (YES in step S704), the processing flow proceeds to step S705. If the preview control module 219 determines that the PT related to the FDS has not been acquired (NO in step S704), the processing flow proceeds to step S706.

In step S705, the preview control module 219 merges the FDS-related PT acquired in step S703 with the provisional FP processing PT. The PT including the merged PT in this step is designated as a provisional FP processing PT. In step S706, the preview control module 219 acquires, from the preview XPS document 221, an FD to which a page to be previewed belongs. In step S707, the preview control module 219 acquires a PT related to the FD acquired in step S706. In step S708, the preview control module 219 determines whether the FD-related PT has been acquired in step S707.

If the preview control module 219 determines that the FD-related PT has been acquired (YES in step S708), the processing flow proceeds to step S709. If the preview control module 219 determines that the FD-related PT has not been acquired (NO in step S708), the processing flow proceeds to step S710.

In step S709, the preview control module 219 merges the FD-related PT acquired in step S707 with the provisional FP processing PT. The PT including the merged PT in this step is designated as a provisional FP processing PT. In step S710, the preview control module 219 acquires an FP of a page to be previewed from the preview XPS document 221. In step S711, the preview control module 219 acquires a PT related to the FP acquired in step S710. In step S712, the preview control module 219 determines whether the FP-related PT has been acquired in step S711.

If the preview control module 219 determines that the FP-related PT has been acquired (YES in step S712), the processing flow proceeds to step S713. If the preview control module 219 determines that the FP-related PT has not been acquired (NO in step S712), the preview control module 219 identifies the provisional FP processing PT as final FP processing PT, and terminates the processing of this routine.

In step S713, the preview control module 219 merges the FP-related PT acquired in step S711 with the provisional FP processing PT, and identifies the FP including the merged PT as final FP processing PT. Then, the preview control module 219 terminates the processing of this routine.

As described above, even when the preview control module 219 processes (modifies) a preview print image on a page of the preview XPS document, the printing system according to an exemplary embodiment can continue actual print processing using the preview XPS document after the print preview.

Therefore, the printing system can prevent the same layout processing from being repeatedly performed for the print preview and the actual print processing, while realizing the CD-R area display function.

Accordingly, an exemplary embodiment enables a user to accurately confirm the contents printed on a CD-R disk before starting the print processing and does not soil a dedicated tray of a printing apparatus. Thus, an exemplary embodiment can provide a print preview function capable of improving the usability of a user. Moreover, an exemplary embodiment can provide an information processing apparatus that does not print preview-oriented information added in a preview operation.

Third Exemplary Embodiment

According to the second exemplary embodiment, when the preview control module 219 processes (modifies) a preview print image on a page of a preview XPS document, the printing system can continue actual print processing after the print image on the page is restored to its original (unprocessed) state. Therefore, the printing system can prevent the same layout processing from being repeatedly performed for the print preview and the actual print processing, while realizing the CD-R area display function.

A printing system according to a third exemplary embodiment is configured to continue actual print processing without restoring the print image on the page to its original (unprocessed) state.

The portions already described in the second exemplary embodiment, e.g., the illustrations in FIGS. 1 and 2, are not described below. Instead of using the processing illustrated in FIG. 15 (which is exclusively performed for the second exemplary embodiment), the third exemplary embodiment executes the processing illustrated in FIG. 19. The processing illustrated in FIG. 17 is peculiar to the second exemplary embodiment. The third exemplary embodiment does not execute the processing illustrated in FIG. 17.

More specifically, if a print start instruction is received from a user after the preview XPS document 221 is completed, the preview control module 219 generates a new print job based on the data of the preview XPS document 221 without performing the preview XPS document reset processing described in the second exemplary embodiment and terminates the processing.

If the print command filter 217 receives XPS data from the preview filter 215, the print command filter 217 performs print command filter processing (as described below) to convert the XPS data into a print command that is interpretable by the printer and outputs the print command.

Figure 19:
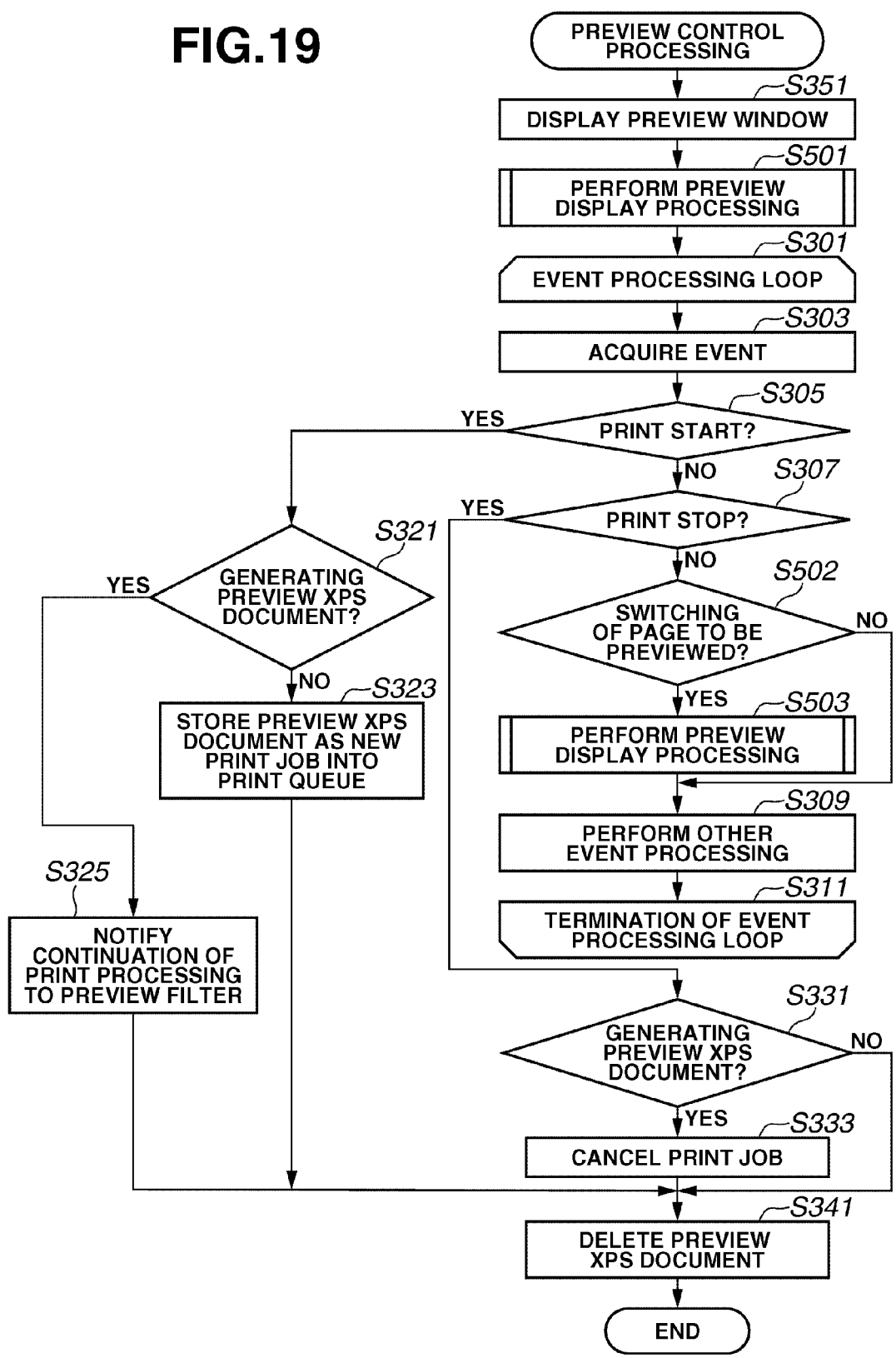
FIG. 19 is a flowchart illustrating an example of preview control module processing according to a third exemplary embodiment of the present invention.

FIG. 19 is a flowchart illustrating exemplary processing performed by the preview control module 219 according to an exemplary embodiment. The flowchart of FIG. 19 is different from the flowchart of FIG. 15 (the second exemplary embodiment) in that the processing of step S504 is omitted.

Figure 20:
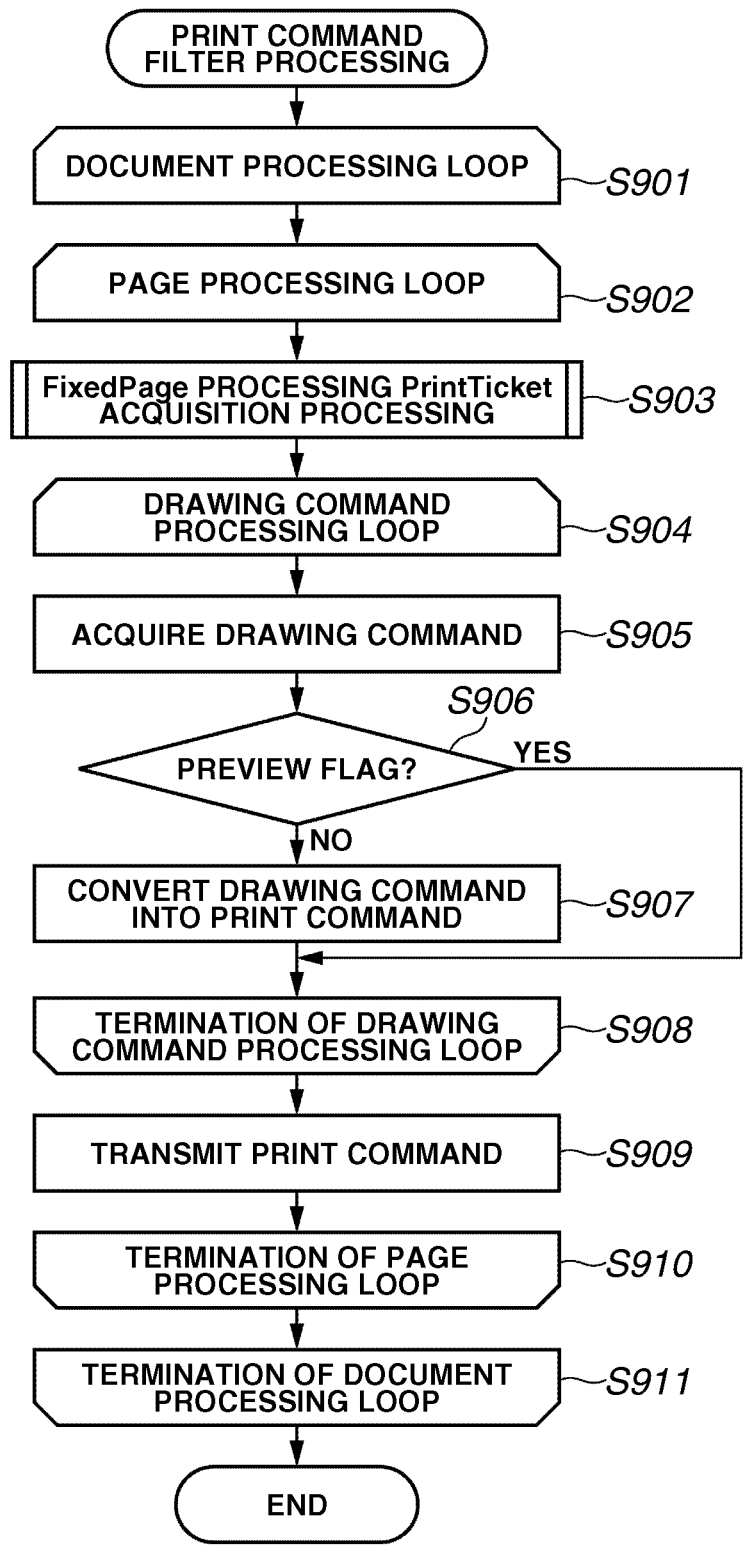
FIG. 20 is a flowchart illustrating an example of print command filter processing according to the third exemplary embodiment of the present invention.

FIG. 20 is a flowchart illustrating exemplary processing performed by the print command filter 217 according to an exemplary embodiment. The CPU of the data processing apparatus 102 can execute each processing step illustrated in FIG. 20 according to a control program loaded into a memory from an external storage apparatus.

A sequential procedure of steps S901 through S911 is a document processing loop performed for each document included in XPS data. Step S901 is a start terminal of the document processing loop. The processing of succeeding steps S902 through S910 is successively performed, from FD of a leading document, for all documents involved in the XPS data.

A sequential procedure of steps S902 through S910 is a page processing loop performed for each page included in the FD. Step S902 is a start terminal of the page processing loop. The processing of succeeding steps S903 through S909 is successively performed, from FP of a leading page, for all pages involved in the FD. In step S903, the print command filter 217 performs FixedPage processing PrintTicket acquisition processing for acquiring print setting information (PT) of the page.

A sequential procedure of steps S904 thorough S908 is a drawing command processing loop performed for each drawing command included in the FP of the page. Step S904 is a start terminal of the drawing command processing loop. The processing of succeeding steps S905 through S907 is successively performed, from a leading drawing command, for all drawing commands involved in the FP. In step S905, the print command filter 217 acquires a drawing command involved in the FP.

In step S906, the print command filter 217 determines whether the drawing command acquired in step S905 is a drawing command stored by the preview control module 219 that performs a preview display. More specifically, the print command filter 217 determines whether the root element of FixedPage declares a private name space, defines "owner"

attribute belonging to this name space as attribute information of the drawing command, and designates the "Previewer" as an attribute value. For example, as described above in FIG. 13B, when the prefix of private name space is declared as "ns0000", the print command filter determines the drawing commands with "ns0000:owner" attribute whose attribute value is "Previewer."

If the print command filter 217 determines that the acquired drawing command is the drawing command stored by the preview control module 219 (YES in step S906), the processing flow proceeds to step S908. If the acquired drawing command is a drawing command other than the drawing command unique to the preview display (NO in step S906), the processing flow proceeds to step S907.

In step S907, the print command filter 217 converts the drawing command acquired in step S905 into a print command that is interpretable by the printer. Step S908 is a terminal end of the drawing command processing loop. The drawing command processing loop repeatedly returns to step S904 until the print command filter 217 completes the processing for the final drawing command involved in the FP. If the print command filter 217 has completed the processing for the final drawing command, the processing flow proceeds to step S909.

In step S909, the print command filter 217 outputs the print command converted in step S907. Step S910 is a terminal end of the page processing loop. The page processing loop repeatedly returns to step S902 until the print command filter 217 completes the processing for the FP of the final page involved in the FD. If the print command filter 217 has completed the processing for the FP of the final page, the processing flow proceeds to step S911.

Step S911 is a terminal end of the document processing loop. The document processing loop repeatedly returns to step S901 until the print command filter 217 completes the processing for the FD of the final document involved in the XPS data. If the print command filter 217 has completed the processing for the FD of the final document, the print command filter 217 terminates the processing of this routine.

Fourth Exemplary Embodiment

According to the first exemplary embodiment, in performing actual print processing after performing a print preview operation, the printing system can continue the actual print processing using the layout processing-completed preview XPS document generated in the print preview operation. Therefore, in the actual print processing, the printing system performs only limited processing required for the layout processing-completed preview XPS document. Thus, the printing system is not required to perform the same layout processing for the print preview and the actual print processing.

There is a conventional printing system that accepts a change request from a user with respect to print settings when a print preview image is displayed and executes print processing according to the changed print settings. In this case, the printing system newly generates a print image for actual print processing after the print preview operation. Therefore, the printing system can perform print processing according to the print settings according to user's intent.

However, the following problem may arise if the printing system according to the first exemplary embodiment accepts a change request from a user during a print preview display operation.

More specifically, according to the first exemplary embodiment, the printing system continues actual print processing directly using the layout processing-completed preview XPS document generated during a print preview operation. However, depending on print setting contents changed during the print preview operation, the processing-completed layout and the changed print settings may contradict each other.

For example, during a display of a preview XPS document of A4 sheet size having been subjected to the 2-in-1 layout processing, a user may change the output sheet setting from A4 to B5. However, the printing system according to the first exemplary embodiment continues the actual print processing directly using the preview XPS document that maintains the 2-in-1 layout print layout for the A4 sheet size. Therefore, the print image does not fit the B5 sheet (which is different from the A4 sheet in size and aspect ratio) and, therefore, some of the print image will be lost along an edge when printed on a sheet. Thus, a user cannot obtain an expected print result (i.e., the 2-in-1 layout of B5 sheet size).

Hence, a printing system according to a fourth exemplary embodiment is configured to accept a change in print settings if the change does not have any adverse effect on the print processing (e.g., layout processing) having been already performed on the preview XPS document, while providing a print setting change function during a print preview display operation performed according to the first exemplary embodiment.

The portions already described in the first exemplary embodiment, e.g., the illustrations in FIGS. 1 and 2, are not described below. Instead of using the processing illustrated in FIG. 11 (which is exclusively performed for the first exemplary embodiment), the fourth exemplary embodiment executes the processing illustrated in FIG. 25.

More specifically, after the layout filter 213 performs the page layout processing based on print setting information, the layout filter 213 performs processing-completion flag storage processing as described below.

On the other hand, the preview control module 219, when activated by the preview filter 215, reads the preview XPS document 221 and performs settable value list display processing for a page to be previewed (e.g., first page) as described below. Similarly, the preview control module 219 performs the settable value list display processing for switching a page displayed according to a user's instruction.

Furthermore, the preview control module 219 performs print setting update processing in response to a user's instruction that changes print settings, as described below.

Exemplary processing-completion flag storage processing performed by the layout filter 213 is described below. First, the layout filter 213 adds a processing-completion flag about layout processing performed based on actually print setting information to the PT acquired by the reference PrintTicket acquisition processing. More specifically, if the 2-in-1 layout print processing is performed referring to the "psf:Feature" element whose "name" attribute value is "psf:JobNupAllDocumentsContiguously", the root element of the PT declares a private name space whose prefix is "ns0000", defines "ns0000:layoutfilterprocess" attribute belonging to the above-described name space as attribute information of the "psf:Feature" element, and designates "done" as an attribute value. Thus, the layout filter 213 can identify completion of the 2-in-1 layout print processing.

Next, the layout filter 213 stores a processing-completion flag about print settings applied to the processing-completed layout processing, as described above. More specifically, if the layout position and the size are determined based on sheet settings in performing the 2-in-1 layout print processing, the layout filter 213 adds attribute information about an element corresponding to sheet settings, i.e., "psf:Feature" element whose "name" attribute value is "psf:PageMediaSize", as described above. Thus, it can be identified that the layout filter 213 has performed the layout processing based on the sheet settings.

The settable value list display processing performed by the preview control module 219 is described below in more detail. First, the preview control module 219 acquires print setting information (PT) of a page to be previewed from a preview XPS document. Next, the preview control module 219 refers to the acquired PT and determines whether the layout filter 213 has performed layout processing based on the print settings that are subjected to a setting change. If the layout filter 213 has performed the layout processing based on the print settings to be changed, the preview control module 219 does not accept the setting change of the print settings.

On the other hand, if the layout filter 213 has not performed the layout processing based on the print settings to be changed, the preview control module 219 determines options whose settings are changeable based on PrintCapabilities (hereinafter, referred to as PC) acquired using the above-described acquired PT, and displays a list of options on a preview screen.

The PrintCapabilities include capability information of a printer and a printer driver (more specifically, information relating to setting values being settable) in performing print settings using the PT, which are described according to the XML format. Similar to the PT, the PrintSchema can regulate the PrintCapabilities.

FIGS. 21A and 21B illustrate exemplary states of the PT after the layout filter 213 has completed the processing-completion flag storage processing.

FIG. 21A illustrates an example of the PT that includes ordinary print settings. According to the example illustrated in FIG. 21A, the layout filter 213 does not perform layout processing for a layout print because the PT does not include layout print settings. Therefore, a processing-completion flag is not added to an element corresponding to the layout print, i.e., "psf:Feature" element whose "name" attribute value is "psf:JobNupAllDocumentsContiguously." Similarly, a processing-completion flag is not added to the sheet settings.

FIG. 21B illustrates an example of the PT that includes 2-in-1 layout print settings. According to the example illustrated in FIG. 21B, the layout filter 213 performs layout processing for a layout print because the PT includes 2-in-1 layout print settings. Therefore, a processing-completion flag is added to an element corresponding to the layout print, i.e., "psf:Feature" element whose "name" attribute value is "psf:JobNupAllDocumentsContiguously." Similarly, a processing-completion flag is added to sheet settings. Therefore, it is understood that, in performing the 2-in-1 layout print processing, the layout has been determined based on the sheet settings.

FIG. 22 illustrates an example of the PC acquired when a settable option is determined by the preview control module 219 that accepts a change in the print settings. According to the example illustrated in FIG. 22, there are a plurality of "psf:Option" elements as child elements of the "psf:Feature" element whose "name" attribute value corresponding to sheet settings is "psf:PageMediaSize." According to this definition, sheet types supported by the printer 231 can be identified.

Furthermore, the exemplary PC illustrated in FIG. 22 defines "constrained" attribute as attribute information relating to the "psf:Option" element. The "constrained" attribute indicates whether a sheet represented by the "psf:Option" element is currently selectable. More specifically, if the attribute value is "psk:None", a sheet expressed by "psf:Option" element is currently selectable. On the other hand, if the attribute value is "psk:PrintTicketSettings", a sheet expressed by "psf:Option" element is not currently selectable. According to the example illustrated in FIG. 22, it is understood that the printer 231 supports five sheet types of "A5", "A4", "B5", "L size", "2L size" which are currently selectable.

Figure 23:
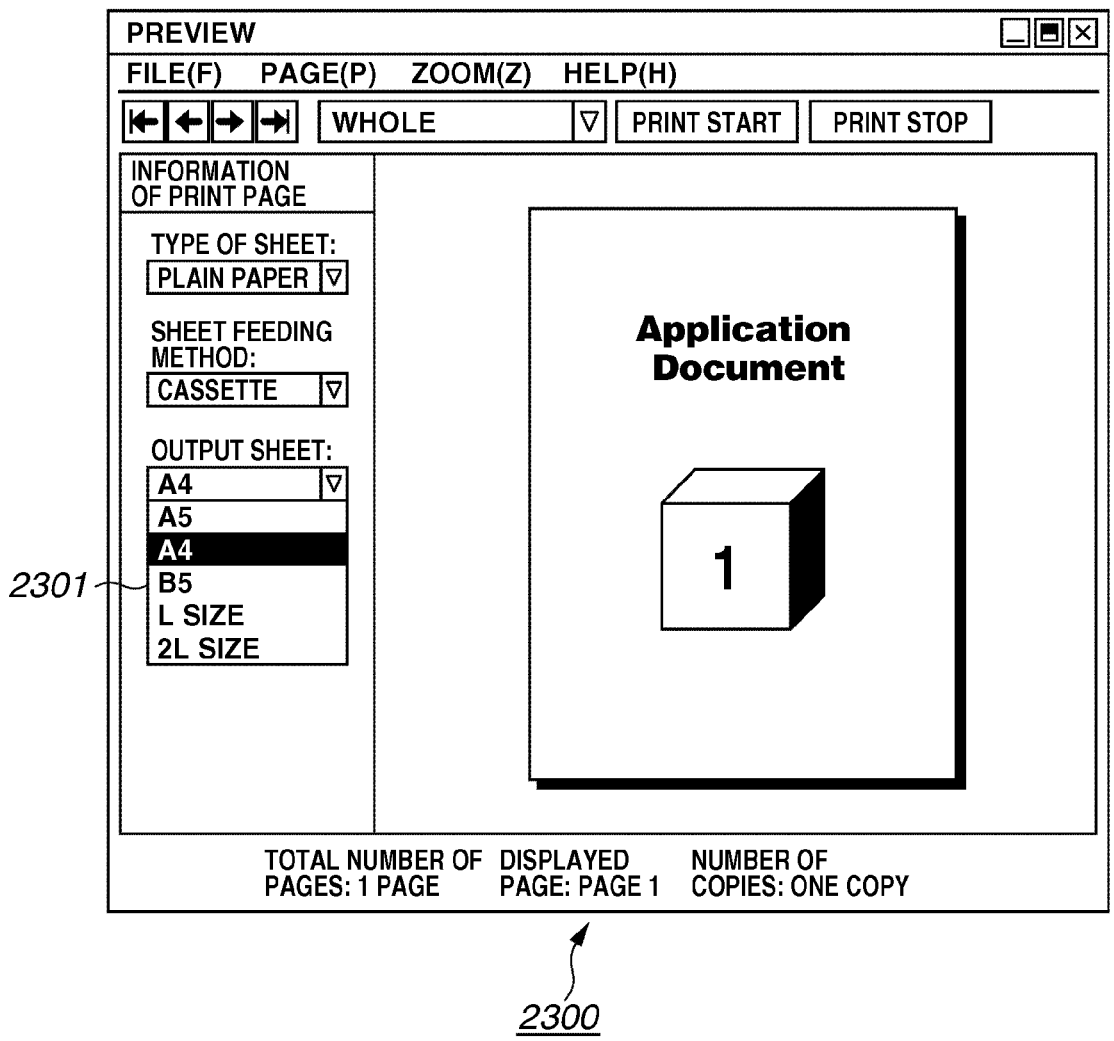
FIG. 23 illustrates a print preview screen relating to ordinary print settings according to the fourth exemplary embodiment of the present invention.

FIG. 23 illustrates an exemplary print preview screen 2300 provided by the preview control module 219. The print preview screen 2300 includes ordinary print settings, such as "type of sheet", "sheet feeding method", and "output sheet", setting values of which are changeable. The print preview screen 2300 includes a list 2301 of selectable sheet types, i.e., five sheet types of "A5", "A4", "B5", "L size", and "2L size."

Figure 24:
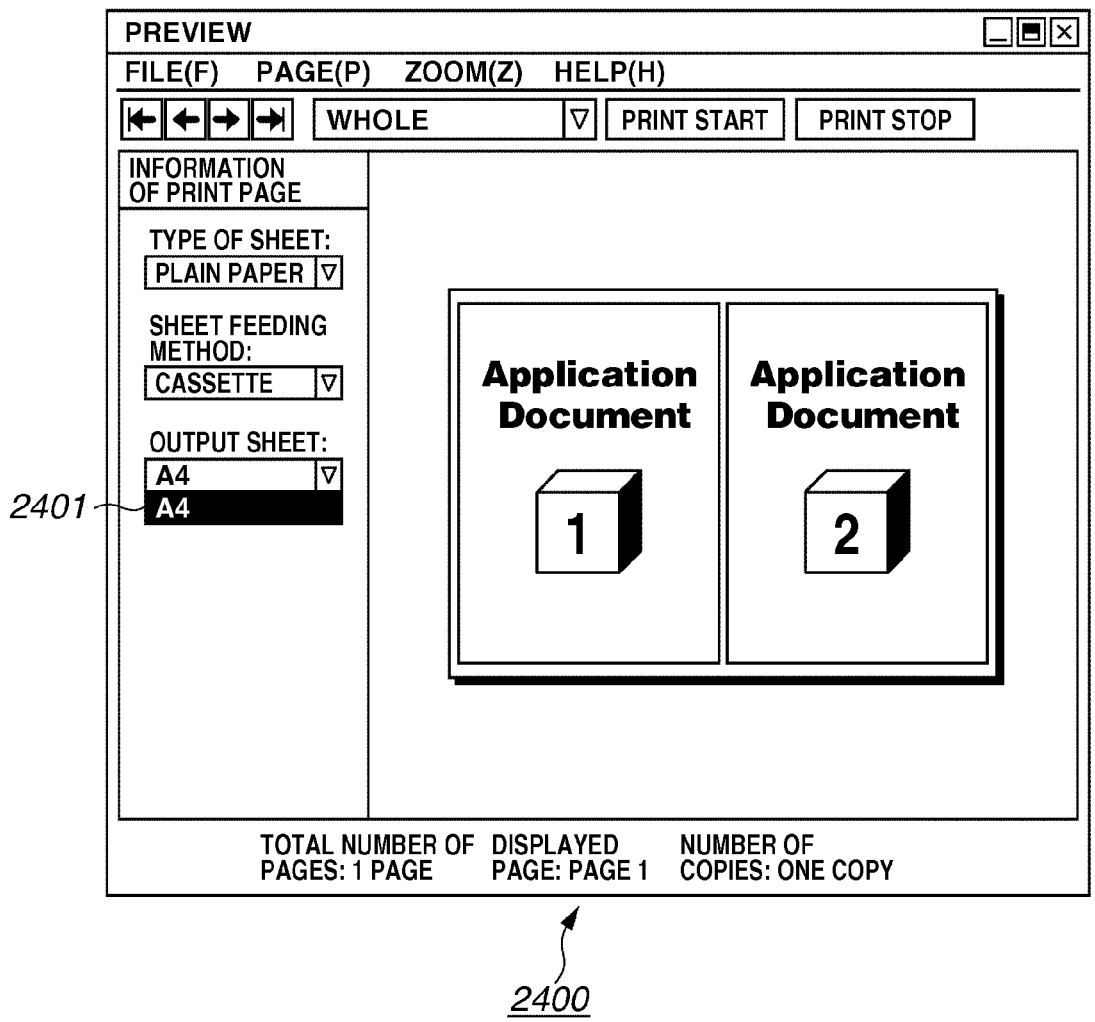
FIG. 24 illustrates a print preview screen relating to 2-in-1 layout print settings according to the fourth exemplary embodiment of the present invention.

FIG. 24 illustrates an exemplary print preview screen 2400 provided by the preview control module 219. The print preview screen 2400 includes 2-in-1 layout print settings. According to the example illustrated in FIG. 24, setting values of the "sheet type", "sheet feeding method", and "output sheet" are changeable. The print preview screen 2400 includes a list 2401 of selectable sheet types. More specifically, only "A4" is selectable according to this example.

Figure 25:
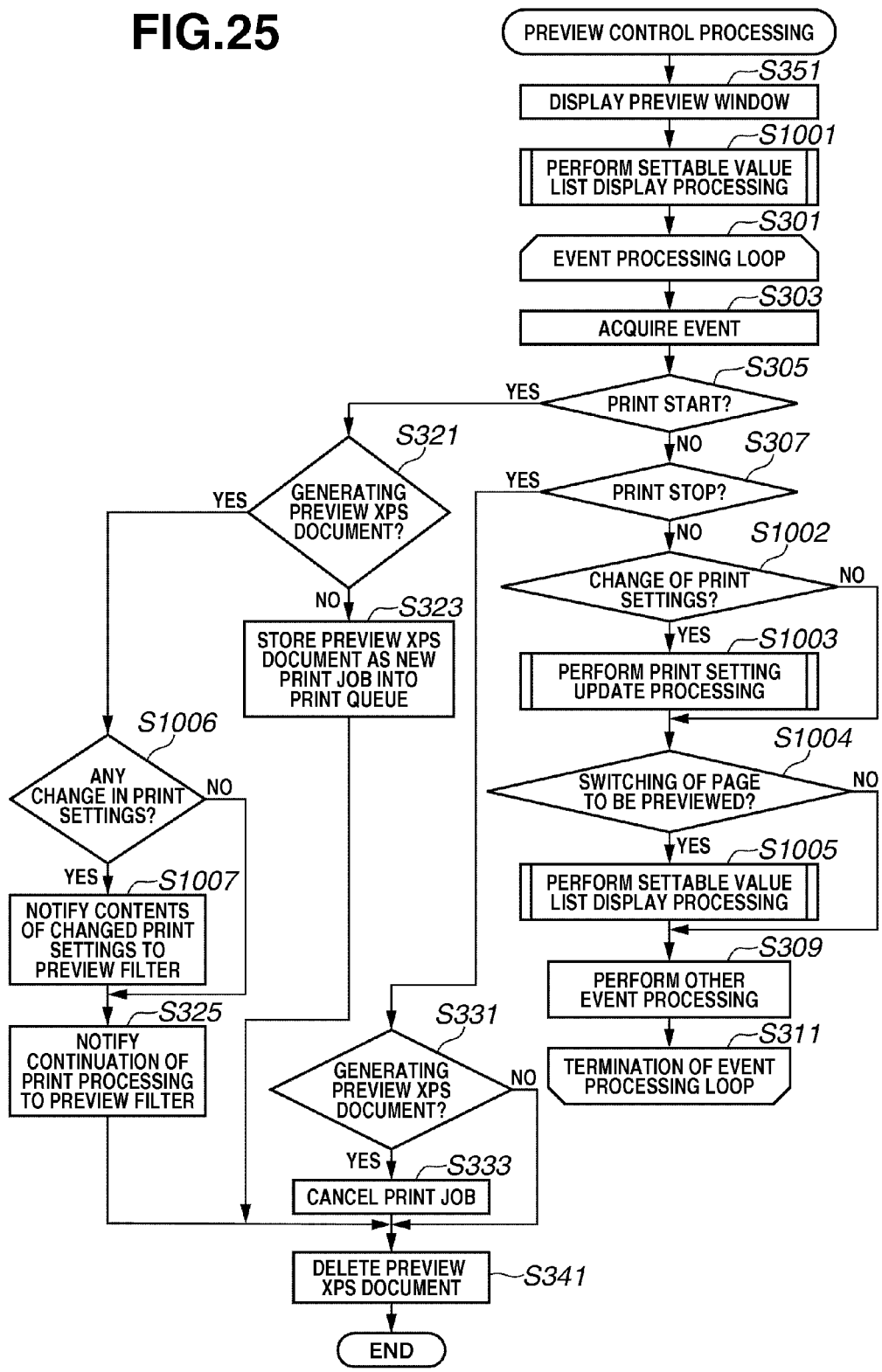
FIG. 25 is a flowchart illustrating an example of preview control module processing according to the fourth exemplary embodiment of the present invention.

FIG. 25 is a flowchart illustrating exemplary processing performed by the preview control module 219 according to an exemplary embodiment. The flowchart of FIG. 25 includes processing steps similar to those described in FIG. 11 (the first exemplary embodiment). Therefore, the same step numbers are used.

In step S1001, the preview control module 219 performs settable value list display processing (as described below) to display changeable print settings and options of a page to be displayed (e.g., first page) on the print preview screen. In step S1002, the preview control module 219 determines whether the event acquired in step S303 is a change of print settings.

If the preview control module 219 determines that the event acquired in step S303 is the change of print settings (YES in step S1002), the processing flow proceeds to step S1003. If the preview control module 219 determines that the event acquired in step S303 is not the change of print settings (NO in step S1002), the processing flow proceeds to step S1004.

In step S1003, the preview control module 219 performs print setting update processing (as described below) to update the PT of the page included in the preview XPS document 221. In step S1004, the preview control module 219 determines whether the event acquired in step S303 is a switching of a page to be previewed.

If the preview control module 219 determines that the event acquired in step S303 is the switching of a page to be previewed (YES in step S1004), the processing flow proceeds to step S1005. If the preview control module 219 determines that the event acquired in step S303 is not the switching of a page to be previewed (NO in step S1004), the processing flow proceeds to step S309.

In step S1005, the preview control module 219 performs settable value list display processing for displaying, on the print preview screen, print settings and options changeable with respect to a page designated by a user in the event acquired in step S303.

In step S1006, the preview control module 219 determines whether there is any change in print settings. If the preview control module 219 determines that there is any change in print settings (YES in step S1006), the processing flow proceeds to step S1007. If the preview control module 219 determines that there is no change in print settings (NO in step S1006), the processing flow proceeds to step S325. In step S1007, the preview control module 219 notifies the contents of changed print settings to the preview filter 215.

Figure 26:
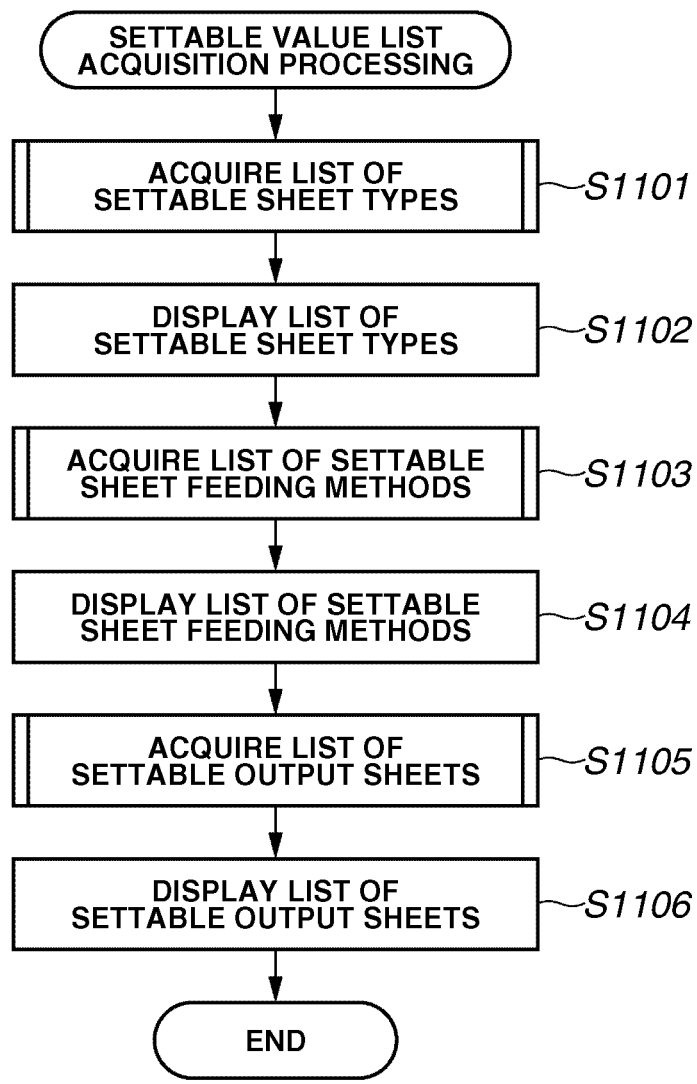
FIG. 26 is a flowchart illustrating an example of settable value list display processing according to the fourth exemplary embodiment of the present invention.

FIG. 26 is a flowchart illustrating details of the settable value list display processing performed in steps S1001 and S1005 illustrated in FIG. 25. The CPU of the data processing apparatus 102 can execute each processing step illustrated in FIG. 26 according to a control program loaded into a memory from an external storage apparatus.

In step S1101, the preview control module 219 performs the settable value list acquisition processing for acquiring a list of sheet types settable for a page to be previewed. In step S1102, the preview control module 219 displays, on the print preview screen, the list of settable sheet types acquired in step S1101. In step S1103, the preview control module 219 performs the settable value list acquisition processing for acquiring a list of sheet feeding methods settable for the page to be previewed.

In step S1104, the preview control module 219 displays, on the print preview screen, the list of sheet feeding methods acquired in step S1103. In step S1105, the preview control module 219 performs the settable value list acquisition processing for acquiring a list of output sheets settable for the page to be previewed. In step S1106, the preview control module 219 displays, on the print preview screen, the list of output sheets acquired in step S1105. Then, the preview control module 219 terminates the processing of this routine.

Figure 27:
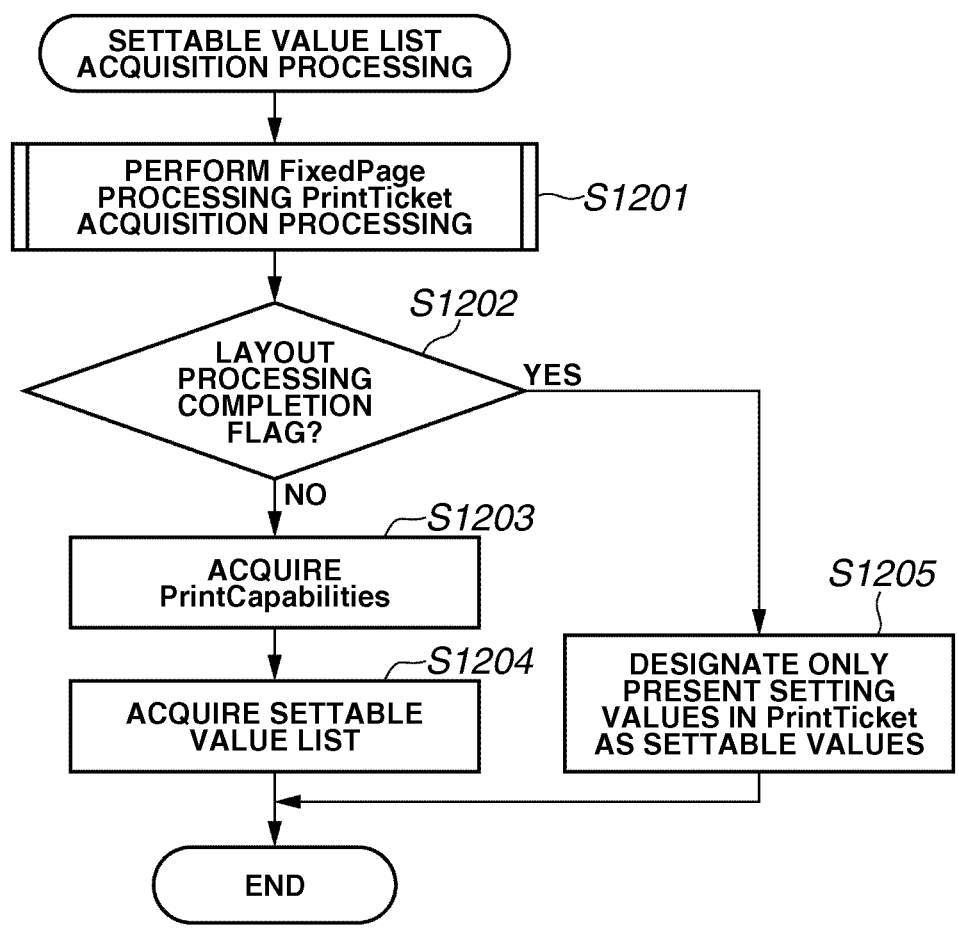
FIG. 27 is a flowchart illustrating an example of settable value list acquisition processing according to the fourth exemplary embodiment of the present invention.

FIG. 27 is a flowchart illustrating details of the settable value list acquisition processing performed in steps S1101, S1103, and S1105 illustrated in FIG. 26. The CPU of the data processing apparatus 102 can execute each processing step illustrated in FIG. 27 according to a control program loaded into a memory from an external storage apparatus.

In step S1201, the preview control module 219 performs FixedPage processing PrintTicket acquisition processing for acquiring print setting information (PT) of a page to be previewed.

In step S1202, the preview control module 219 refers to the PT acquired in step S1201 and determines whether a layout processing completion flag is added to the print settings for which the settable value list is acquired. More specifically, to acquire a settable value list with respect to the type of sheet, the preview control module 219 determines whether the root element of the PT declares a private name space, defines "layoutfilterprocess" attribute belonging to this name space as attribute information of the "Feature" element whose "name" attribute value is "psf:PageMediaType", and designates "done" as an attribute value. For example, when the prefix of a private name space is "ns0000", the attribute described above is "ns0000:layoutfilterprocess."

If the preview control module 219 determines that the layout processing completion flag is added (YES in step S1202), the processing flow proceeds to step S1205. If the preview control module 219 determines that the layout processing completion flag is not added (NO in step S1202), the processing flow proceeds to step S1203.

In step S1203, the preview control module 219 refers to the PT acquired in step S1201 and acquires PrintCapabilities (PC) according to the present print settings. In step S1204, the preview control module 219 refers to the PC acquired in step S1203 and acquires a settable value list. In step S1205, the preview control module 219 refers to the PT acquired in step S1201 and designates only the contents of print settings included in the PT as settable values. Then, the preview control module 219 terminates the processing of this routine.

Figure 28:
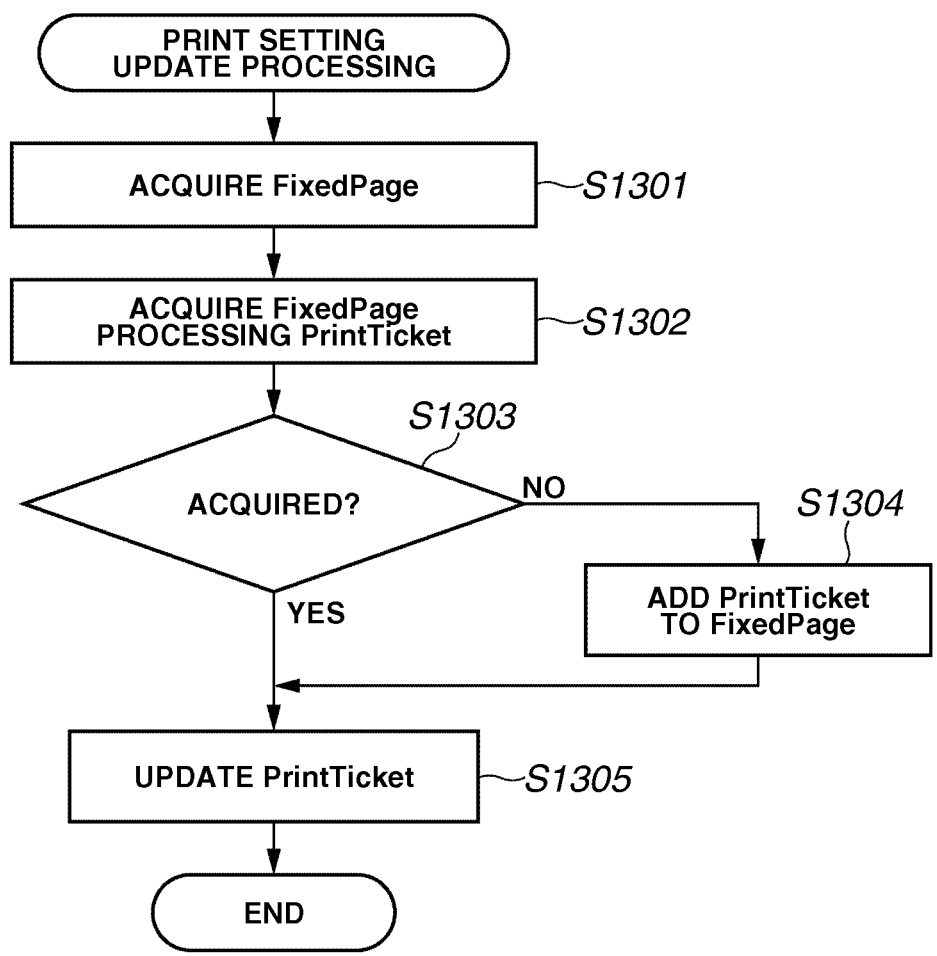
FIG. 28 is a flowchart illustrating an example of print setting update processing according to the fourth exemplary embodiment of the present invention.

FIG. 28 is a flowchart illustrating details of the print setting update processing performed in step S1003 illustrated in FIG. 25. The CPU of the data processing apparatus 102 can execute each processing step illustrated in FIG. 28 according to a control program loaded into a memory from an external storage apparatus.

In step S1301, the preview control module 219 acquires an FP of a page to be previewed from the preview XPS document 221. In step S1302, the preview control module 219 acquires a PT related to the FP acquired in step S1301. In step S1303, the preview control module 219 determines whether the FP-related PT has been acquired in step S1302.

If the preview control module 219 determines that the FP-related PT has been acquired (YES in step S1303), the processing flow proceeds to step S1305. If the preview control module 219 determines that the FP-related PT has not been acquired (NO in step S1303), the processing flow proceeds to step S1304.

In step S1304, the preview control module 219 generates a PT that does not include any print settings and relates the generated PT with the FP acquired in step S1301. More specifically, an exemplary PT including no print settings is a PT including only root elements. In step S1305, the preview control module 219 reflects changes in the print settings received from a user to the FP-related PT of a page to be previewed. Then, the preview control module 219 terminates the processing of this routine.

Thus, the printing system according to an exemplary embodiment can accept a change in print settings if the change does not have any adverse effect on the print processing (e.g., layout processing) having been already performed on the preview XPS document, while providing a print setting change function during a print preview display operation performed according to the first exemplary embodiment.

Thus, the printing system is not required to perform the same layout processing for the print preview and the actual print processing, while providing the print setting change function. Accordingly, a user can easily confirm the contents of print settings being set by the application during a print preview display. Furthermore, if there is any error in the print settings, a user can change print settings (although changeable items may be limited). Thus, the printing system can provide an excellent print preview function.

Fifth Exemplary Embodiment

FIG. 29 illustrates a memory map of a storage medium that stores various data processing programs readable by an information processing apparatus according an exemplary embodiment of to the present invention.

Although not illustrated, the storage medium can store management information for the programs stored in the storage medium, such as version information and creator name, and information relevant to the OS that reads the programs, e.g. icons discriminately displaying the programs.

Furthermore, a directory of the storage medium can manage data belonging to various programs. Moreover, the storage medium can store a program for installing various programs on a computer and a decompression program if the installed program is compressed.

A host computer can execute programs installed from an external device to realize the functions comparable to the processing steps illustrated in FIGS. 8 to 11, FIGS. 15 to 20, and FIGS. 25 to 28 according to the above-described exemplary embodiments. In this case, the present invention encompasses an information group including the programs that can be supplied to an output apparatus using a storage medium (e.g., CD-ROM, flash memory, or floppy disk (FD)), or from an external storage medium via a network.

Moreover, software program code for realizing the functions of the above-described exemplary embodiments can be supplied to a system or an apparatus including various devices. A computer (or CPU or micro-processing unit (MPU)) in the system or the apparatus can execute the program to operate the devices to realize the functions of the above-described exemplary embodiments. Accordingly, the present invention encompasses the program code installable on a computer when the functions or processes of the exemplary embodiments can be realized by the computer.

In this case, the program code itself can realize the functions of the exemplary embodiments. The equivalents of programs can be used if they possess comparable functions. Furthermore, the present invention encompasses supplying program code to a computer with a storage (or recording) medium storing the program code. In this case, the type of program can be any one of object code, interpreter program, and OS script data. A storage medium supplying the program can be selected from any one of a floppy disk, a hard disk, an optical disk, a magneto-optical (MO) disk, a compact disk— ROM (CD-ROM), a CD-recordable (CD-R), a CD-rewritable (CD-RW), a magnetic tape, a nonvolatile memory card, a ROM, and a digital versatile disc (DVD) (DVD-ROM, DVD-R).

The method for supplying the program includes accessing a web site on the Internet using the browsing function of a client computer, when the web site allows each user to download the computer program of the present invention, or compressed files of the programs having automatic installing functions, to a hard disk or other recording medium of the user.

Furthermore, the program code constituting the programs of the present invention can be divided into a plurality of files so that respective files are downloadable from different web sites. Namely, the present invention encompasses World Wide Web (WWW) servers that allow numerous users to download the program files so that the functions or processes of the present invention can be realized on their computers.

Enciphering the programs of the present invention and storing the enciphered programs on a CD-ROM or comparable recording medium is an exemplary method when the programs of the present invention are distributed to the users. The authorized users (i.e., users satisfying predetermined conditions) are allowed to download key information from a web page on the Internet. The users can decipher the programs with the obtained key information and can install the programs on their computers. When the computer reads and executes the installed programs, the functions of the above-described exemplary embodiments can be realized.

Moreover, an operating system (OS) or other application software running on a computer can execute part or all of actual processing based on instructions of the programs.

Additionally, the program code read out of a storage medium can be written into a memory of a function expansion board equipped in a computer or into a memory of a function expansion unit connected to the computer. In this case, based on an instruction of the program, a CPU provided on the function expansion board or the function expansion unit can execute part or the whole of the processing so that the functions of the above-described exemplary embodiments can be realized.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-342823 filed Dec. 20, 2006 and Japanese Patent Application No. 2007-019469 filed Jan. 30, 2007, which are hereby incorporated by reference herein in their entirety.

What is claimed is:

1. An information processing apparatus comprising a processor which executes a program stored in a memory, wherein the processor functions as:
   a layout processing unit configured to receive document data from a specific storing area;
   a preview document generation unit configured to receive layout-processed document data from the layout processing unit, the layout-processed document data being document data on which layout processing has been performed;
   a preview control unit configured to receive the layout-processed document data from the preview document generation unit and to control display of a preview based on the layout-processed document data; and
   a print command generation processing unit configured to receive the layout-processed document data from the preview document generation unit,
   wherein, if display of the preview is completed, the layout processing unit is configured to output the layout-processed document data received from the specific storing area spool file to the preview document generation unit without performing new layout processing based on print setting information, and if display of the preview is not completed, the layout processing unit is configured to perform layout processing on the document data received from the specific storing area based on the print setting information and to output the layout-processed document data to the preview document generation unit,
   wherein, if display of the preview is completed or is not set, the preview document generation unit is configured to output the layout-processed document data to the print command generation processing unit, and if display of the preview is set while the display of the preview is not completed, the preview document generation unit is configured to the layout-processed document data to the preview control unit,
   wherein the preview control unit is configured to output, to the specific storing area, the layout-processed document data to which display of the preview is completed based on a print instruction, and
   wherein the print command generation processing unit is configured to convert the layout-processed document data into a print command that is interpretable by a printer.

2. A method for controlling an information processing apparatus comprising a processor for executing the steps of:
   if display of a preview is completed, outputting layout-processed document data received from a specific storing area without performing new layout processing based on print setting information;
   if display of the preview is not completed, performing layout processing on the document data received from the specific storing area based on the print setting information and outputting the layout-processed document data;
   if display of the preview is completed or not set, outputting the layout-processed document data;
   if display of the preview is set while the display of the preview is not completed, outputting the layout-processed document data;

outputting, to the specific storing area, the layout-processed document data to which display of the preview is completed based on a print instruction; and converting the layout-processed document data into a print command that is interpretable by a printer.

3. A non-transitory computer readable medium storing a program including computer-executable instructions for an information processing apparatus, the medium comprising:

computer-executable instructions for, if display of a preview is completed, outputting layout-processed document data received from a specific storing area without performing new layout processing based on print setting information;

computer-executable instructions for, if display of the preview is not completed, performing layout processing on the document data received from the specific storing area based on the print setting information and outputting the layout-processed document data;

computer-executable instructions for, if display of the preview is completed or is not set, outputting the layout-processed document data;

computer-executable instructions for, if display of the preview is set while the display of the preview is not completed, outputting the layout-processed document data;

computer-executable instructions for outputting, to the specific storing area, the layout-processed document data to which display of the preview is completed based on a print instruction; and computer-executable instructions for converting the layout-processed document data into a print command that is interpretable by a printer.

4. A non-transitory computer readable medium containing computer-executable instructions for an information processing apparatus, the medium comprising:

computer-executable instructions for a layout processing step of receiving document data from a specific storing area;

computer-executable instructions for a preview document generation step of receiving layout-processed document data on which layout processing has been performed from the layout processing step;

computer-executable instructions for a preview control step of receiving the layout-processed document data from the preview document generation step and controlling display of a preview based on the layout-processed document data; and computer-executable instructions for a print command generation processing step of receiving the layout-processed document data from the preview document generation step, wherein, if display of the preview is completed, the layout processing step includes computer-executable instructions for outputting the layout-processed document data received from the specific storing area to the preview document generation step without performing new layout processing based on print setting information, wherein, if display of the preview is not completed, the layout processing step includes computer-executable instructions for performing layout processing on the document data received from the specific storing area based on the print setting information and outputting the layout-processed document data to the preview document generation step, wherein, if display of the preview is completed or is not set, the preview document generation step includes computer-executable instructions for outputting the layout-processed document data to the print command generation processing step, wherein, if display of the preview is set while the display of the preview is not completed, the preview document generation step includes computer-executable instructions for outputting the document data based on the layout-processed document data to the preview control step, wherein the preview control step includes computer-executable instructions for outputting, to the specific storing area, the layout-processed document data to which display of the preview is completed based on a print instruction, and wherein the print command generation processing step includes computer-executable instructions for converting the layout-processed document data into a print command that is interpretable by a printer.

5. The information processing apparatus according to claim 1, wherein the layout processing unit includes a layout filter, the preview document generation unit includes a preview filter, and the print command generation processing unit includes a print command filter.

6. The information processing apparatus according to claim 1, wherein setting of the preview is performed with a print setting screen of a printer driver.

7. The information processing apparatus according to claim 1, wherein the specific storing area is a spool file.

8. The method according to claim 2, wherein layout processing includes layout filtering, wherein display of the preview includes preview filtering, and wherein converting the layout-processed document data into the print command includes print command filtering.

9. The method according to claim 2, wherein setting of the preview is performed with a print setting screen of a printer driver.

10. The method according to claim 2, wherein the specific storing area is a spool file.

11. The non-transitory computer readable medium according to claim 3, wherein layout processing includes layout filtering, wherein display of the preview includes preview filtering, and wherein converting the layout-processed document data into the print command includes print command filtering.

12. The non-transitory computer readable medium according to claim 3, wherein setting of the preview is performed with a print setting screen of a printer driver.

13. The non-transitory computer readable medium according to claim 3, wherein the specific storing area is a spool file.

14. The non-transitory computer readable medium according to claim 4, wherein layout processing includes layout filtering, wherein display of the preview includes preview filtering, and wherein converting the layout-processed document data into the print command includes print command filtering.

15. The non-transitory computer readable medium according to claim 4, wherein setting of the preview is performed with a print setting screen of a printer driver.

16. The non-transitory computer readable medium according to claim 4, wherein the specific storing area is a spool file.

* * * * *